(12) United States Patent
Call et al.

(10) Patent No.: US 11,937,560 B2
(45) Date of Patent: Mar. 26, 2024

(54) AUTONOMOUS GREENHOUSE CONTROL SYSTEM

(71) Applicant: Zordi, Inc., Boston, MA (US)

(72) Inventors: Casey Bennet Call, Franklin, TN (US); Erik Dadulo Groszyk, Millcreek, UT (US); Gilwoo Lee, Jackson, TN (US)

(73) Assignee: Zordi, Inc., Boston, MA (US)

( * ) Notice: Subject to any disclaimer, the term of this patent is extended or adjusted under 35 U.S.C. 154(b) by 0 days.

(21) Appl. No.: 17/729,804

(22) Filed: Apr. 26, 2022

(65) Prior Publication Data

US 2022/0338421 A1    Oct. 27, 2022

Related U.S. Application Data

(60) Provisional application No. 63/180,610, filed on Apr. 27, 2021.

(51) Int. Cl.
*A01G 7/06* (2006.01)
*A01G 9/26* (2006.01)
*G05B 19/4155* (2006.01)

(52) U.S. Cl.
CPC ............... *A01G 7/06* (2013.01); *A01G 9/26* (2013.01); *G05B 19/4155* (2013.01); *G05B 2219/50391* (2013.01)

(58) Field of Classification Search
CPC .......... A01G 7/06; A01G 9/26; A01G 27/003; A01G 9/24; A01G 9/14; A01G 9/143; A01G 27/00; Y02A 40/25; Y02A 40/28; Y02A 40/10; G05B 19/4155; G05B 2219/50391
USPC ...................................................... 47/17, 1.7
See application file for complete search history.

(56) References Cited

U.S. PATENT DOCUMENTS

| | | |
|---|---|---|
| 2011/0125477 A1* | 5/2011 | Lightner .............. G05B 13/048 703/11 |
| 2013/0325242 A1 | 12/2013 | Cavender-bares et al. |
| 2017/0032258 A1* | 2/2017 | Miresmailli .......... G06N 20/00 |
| 2017/0161560 A1 | 6/2017 | Itzhaky et al. |
| 2017/0161627 A1 | 6/2017 | Xu et al. |
| 2019/0050948 A1* | 2/2019 | Perry ................... A01B 79/005 |

(Continued)

OTHER PUBLICATIONS

International Search Report and Written Opinion dated Jun. 29, 2022, for PCT Patent Application No. PCT/US22/71929 filed on Apr. 26, 2022, seventeen pages.

*Primary Examiner* — Jeffrey R Larsen
(74) *Attorney, Agent, or Firm* — Morrison & Foerster LLP

(57) ABSTRACT

An exemplary computer-implemented method for administering one or more treatments to a plant in a greenhouse comprises: receiving data associated with the plant; providing the received data to a trained machine-learning prediction model to obtain: a first set of health predictions of the plant corresponding to a present time; and a second set of health predictions of the plant corresponding to a future time; determining whether the plant is unhealthy or lagging a growth trajectory based on: a first comparison based on the first set of health predictions and observed health of the plant at the present time, and a second comparison based on the second set of health predictions and a future production goal of the plant; if the plant is unhealthy or lagging the growth trajectory, identifying the treatments for the plant; and controlling one or more robots in the greenhouse to administer the treatments.

20 Claims, 12 Drawing Sheets

(56) References Cited

U.S. PATENT DOCUMENTS

2020/0134741 A1\* 4/2020 Bongartz ............. A01G 31/042
2022/0164736 A1\* 5/2022 Johnson ................ G06Q 50/02

\* cited by examiner

|        | Plant-specific Features | Microclimate Section Features | Irrigation Section Features | Work Section Features | Predicted/Forecasted Features |
|--------|---|---|---|---|---|
| Plant 1 | Feature Values 1002a | Feature Values 1004a | Feature Values 1006a | Feature Values 1008a | Feature Values 1010a |
| Plant 2 | Feature Values 1002b | Feature Values 1004b | Feature Values 1006b | Feature Values 1008b | Feature Values 1010b |
| ... | | | | | |
| Plant N | Feature Values 1002z | Feature Values 1004z | Feature Values 1006z | Feature Values 1008z | Feature Values 1010z |

AUTONOMOUS GREENHOUSE CONTROL SYSTEM

CROSS-REFERENCE TO RELATED APPLICATION

This application claims the benefit of U.S. Provisional Application 63/180,610, filed on Apr. 27, 2021, the entire contents of which are incorporated herein by reference for all purposes.

FIELD OF INVENTION

The present disclosure relates generally to digital farming, and more specifically to machine-learning (ML) techniques for implementing a farming control system (e.g., an autonomous greenhouse control system).

BACKGROUND

Greenhouses may be an effective way of growing plants (e.g., fruits and vegetables) throughout the year to provide access to fresh food products. However, greenhouse management can be resource-intensive, inefficient, and expensive. For example, human workers may be required to closely and constantly monitor the plants in the greenhouse. Further, significant expertise may be required for the growers to identify ongoing health issues of the plants in a timely manner and to determine the proper mitigation actions. Further still, timely and proper implementation of the mitigation actions may be resource-intensive and impractical to achieve.

BRIEF SUMMARY

An exemplary computer-implemented method for administering one or more treatments to a plant in a greenhouse comprises: receiving data associated with the plant, wherein the data is at least partially obtained using one or more sensors in the greenhouse; providing the received data to a trained machine-learning prediction model to obtain: a first set of health predictions of the plant corresponding to a present time; and a second set of health predictions of the plant corresponding to a future time; determining whether the plant is unhealthy or lagging a growth trajectory based on: a first comparison based on the first set of health predictions and observed health of the plant at the present time, and a second comparison based on the second set of health predictions and a future production goal of the plant; if the plant is unhealthy or lagging the growth trajectory, identifying the one or more treatments for the plant; and controlling one or more robots in the greenhouse to administer the one or more treatments to the plant.

In some embodiments, the one or more treatments comprise: applying a fertilizer to the plant, applying a pesticide to the plant, removing the plant from the greenhouse, transplanting a new plant to replace the plant, performing a lab test on the plant, collecting data on the plant, updating irrigation settings for the plant, updating nutrient settings for the plant, or any combination thereof.

In some embodiments, the trained prediction model comprises: a supervised machine-learning model, a multi-modal Gaussian process regression model, a non-linear regression model, a process-driven model, a residual-based machine-learning model, a weight-based machine-learning model, a generative-adversarial machine-learning model, or any combination thereof.

In some embodiments, the first set of health predictions of the plant is obtained by: obtaining a plurality of historical feature values based on the received data; and providing the plurality of historical feature values to the trained prediction model to obtain the first set of health predictions of the plant.

In some embodiments, the plurality of historical feature values comprises information related to a historical treatment to the plant.

In some embodiments, the second set of health predictions of the plant is obtained by: obtaining a plurality of historical feature values based on the received data; obtaining a plurality of present feature values based on the received data; and providing the plurality of historical feature values and the plurality of present feature values to the trained prediction model to obtain the second set of health predictions.

In some embodiments, determining whether the plant is unhealthy or lagging the growth trajectory is further based on a comparison based on the first set of health predictions and the future production goal of the plant.

In some embodiments, the first set of health predictions and the second set of health predictions are with respect to a plurality of output features.

In some embodiments, the plurality of output features comprises: a sellable yield, a flower count, a sellable fruit count, a weight of a fruit, a flower-to-fruit conversion ratio, a canopy height, a stem length, a biomass, a number of leaves, a leaf area index, or any combination thereof.

In some embodiments, identifying the one or more treatments for the plant comprises: identifying a subset of output features from the plurality of output features based on the first comparison and/or the second comparison; providing information related to the subset of output features to a trained machine-learning root cause analysis model to obtain one or more root causes; identifying one or more mitigation actions based on the one or more root causes; and providing information related to the one or more mitigation actions to a trained machine-learning work order model to obtain the one or more treatments.

In some embodiments, the trained machine-learning root cause analysis model is configured to output a plurality of probabilities associated with a plurality of root causes.

In some embodiments, the one or more root causes are identified based on the plurality of probabilities.

In some embodiments, the trained machine-learning root cause analysis model comprises a supervised model, a decision tree, a plant growth simulator, an imitation learning model, or any combination thereof.

In some embodiments, the trained machine-learning work order model comprises a supervised model, an imitation model, a reinforcement model, a decision tree, or any combination thereof.

In some embodiments, the method further comprises: evaluating, using the prediction model, an effectiveness of the one or more mitigation actions.

In some embodiments, the method further comprises: adjusting the first set of health predictions of the plant based on one or more health predictions of a neighboring plant in the greenhouse.

In some embodiments, the received data comprises information related to: a plurality of plant-specific features, a plurality of microclimate section features, a plurality of irrigation section features, a plurality of work section features, one or more images of the plant, or any combination thereof.

In some embodiments, the method further comprises: if the plant is healthy and tracking the growth trajectory, optimizing a growth plan for the plant, applying an existing treatment to the plant, monitoring the plant, generating a work order to prune the plant, or any combination thereof.

In some embodiments, the data associated with the plant is at least partially obtained using a robot or based on one or more user inputs.

In some embodiments, the method further comprises: assigning one or more tasks to a human worker if the plant is unhealthy or lagging the growth trajectory.

An exemplary system for administering one or more treatments to a plant in a greenhouse comprises: one or more processors; a memory; and one or more programs, wherein the one or more programs are stored in the memory and configured to be executed by the one or more processors, the one or more programs including instructions for: receiving data associated with the plant, wherein the data is at least partially obtained using one or more sensors in the greenhouse; providing the received data to a trained machine-learning prediction model to obtain: a first set of health predictions of the plant corresponding to a present time; and a second set of health predictions of the plant corresponding to a future time; determining whether the plant is unhealthy or lagging a growth trajectory based on: a first comparison based on the first set of health predictions and observed health of the plant at the present time, and a second comparison based on the second set of health predictions and a future production goal of the plant; if the plant is unhealthy or lagging the growth trajectory, identifying the one or more treatments for the plant; and controlling one or more robots in the greenhouse to administer the one or more treatments to the plant.

An exemplary non-transitory computer-readable storage medium stores one or more programs for administering one or more treatments to a plant in a greenhouse, the one or more programs comprising instructions, which when executed by one or more processors of an electronic device, cause the electronic device to: receive data associated with the plant, wherein the data is at least partially obtained using one or more sensors in the greenhouse; provide the received data to a trained machine-learning prediction model to obtain: a first set of health predictions of the plant corresponding to a present time; and a second set of health predictions of the plant corresponding to a future time; determine whether the plant is unhealthy or lagging a growth trajectory based on: a first comparison based on the first set of health predictions and observed health of the plant at the present time, and a second comparison based on the second set of health predictions and a future production goal of the plant; if the plant is unhealthy or lagging the growth trajectory, identify the one or more treatments for the plant; and control one or more robots in the greenhouse to administer the one or more treatments to the plant.

Using the system described herein, greenhouses can be efficiently managed with minimal human effort and intervention. The system can closely and constantly monitor the plants in a greenhouse, detect ongoing health issues on a per-plant basis, intelligently identify the appropriate treatment options by taking account of the cost, benefit, and production goals, and administer the treatments using robots in an autonomous manner. Accordingly, the system provides for modular and autonomous greenhouses designed to provide sustainably grown fruits and vegetables. The greenhouses can operate near major cities to create short and efficient supply chains to ensure that fresh fruits are readily available anywhere, enabling consumers to get access to fresh food products.

DESCRIPTION OF THE FIGURES

The disclosed embodiments have other advantages and features which will be more readily apparent from the detailed description, the appended claims, and the accompanying figures (or drawings). A brief introduction of the figures is below.

FIG. 10 illustrates an exemplary portion of input data of an exemplary system, in accordance with some embodiments.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Figure 1:
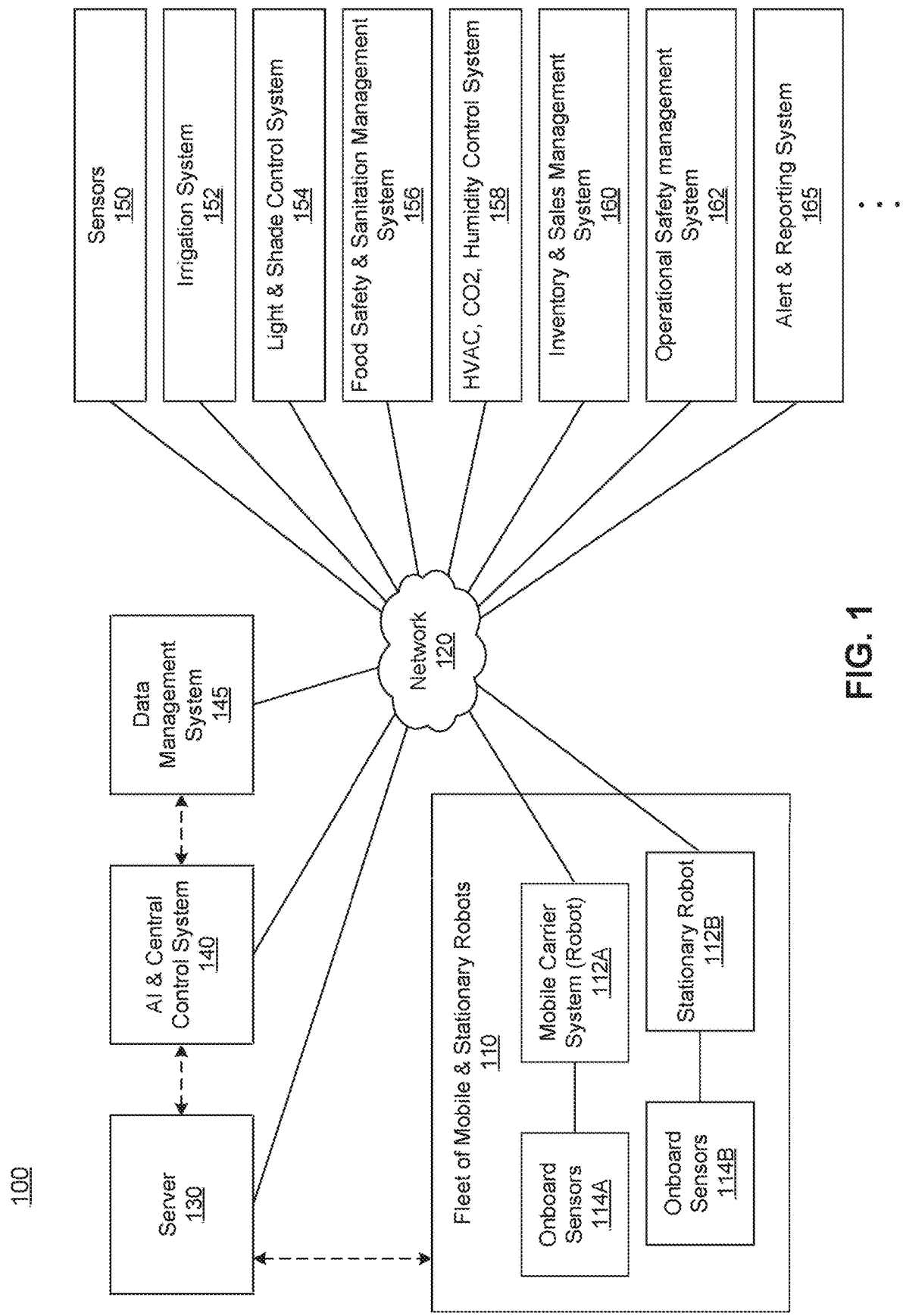
FIG. 1 illustrates a system architecture for an autonomous greenhouse control system having mobile and stationary robots, according to one embodiment.

FIG. 1 illustrates a system architecture for an autonomous greenhouse control system having mobile and stationary robots, according to one embodiment. The autonomous greenhouse control system 100 overlooks the operation of a farm or greenhouse. The autonomous greenhouse control system 100 communicates with various subsystems such as a mobile carrier system 112 (e.g., a mobile robot), or one or more external systems. The autonomous greenhouse control system 100 predicts sales and yield for the farm or greenhouse. The autonomous greenhouse control system 100 infers and detects growth patterns, climate changes, and any other events relevant to the farm's operation.

The autonomous greenhouse control system 100 distributes tasks among robots 112 (such as a mobile robot or a stationary robot) and growers/human workers. Moreover, the autonomous greenhouse control system 100 controls the robots 112 to perform certain tasks assigned to them. For example, the autonomous greenhouse control system 100 controls one or more robots to manipulate and handle one or more crops. Additionally, the autonomous greenhouse control system 100 controls other subsystems to change and manage other farm operations (such as changing environmental conditions of the farm).

The autonomous greenhouse control system 100 includes a server 130, an AI & central control system 140, a data management system 145, one or more sensors 150, an irrigation system 152, a light & shade control system 154, a food safety & sanitation management system 156, an HVAC, CO2, and humidity control system 158, an inventory & sales management system 160, an operational safety management system 162, an alert & reporting system 165, and a fleet of mobile and stationary robots 110.

The sensors 150 may include RGB cameras, temperature sensors, depth sensors, humidity sensors, infrared cameras, heat cameras, air monitor, etc. In some embodiments, sensors are embedded on one or more robots 112. Moreover, a set of sensors may be distributed throughout the farm to sense data at various locations throughout the farm.

The food safety & sanitation management system 156 maintains food safety and sanitation protocols for the farm. Additionally, the food safety & sanitation management system 156 keeps records related to food safety and sanitation protocols for the farm.

The operational safety management system 162 maintains the general operational safety program for the farm. In some embodiments, the operational safety management system 162 keeps records related to operational safety for the farm.

The alert & reporting system 165 monitors, logs, and reports the operations of the carrier systems (e.g., mobile carrier system 112A or stationary robot 112B), the one or more sensors 150, and the software running in the server 130, AI & central control system 140 and the data management system 145.

The inventory & sales management system 160 manages inventory of the farm or greenhouse. In some embodiments, the inventory & sale management system 160 keeps track of available inventory in the farm or greenhouse and projects the availability of inventory in the future based on current inventory consumption. In some embodiments, the inventory & sales management system 160 sends a notification when a certain item is projected to be below a set threshold. Alternatively, the inventory & sales management system 160 automatically orders inventory if a certain item is predicted to be below the set threshold.

The data management system 145 manages and stores the large-scale real-time data. For example, the data management system 145 manages and stores sensor data received from the one or more sensors 150, irrigation data received from the irrigation system 152, food safety and sanitation information received from the food safety & sanitation management system 156, inventory and sales data received from the inventory & sales management system 160, safety data received from the operational safety management system 162, etc.

The server 130 facilitates communication between the AI & central control system 140 and other components of the autonomous greenhouse control system 100. For example, the server facilitates communication between a mobile carrier system 112A and the AI & central control system 140.

AI & Central Control System

Figure 2:
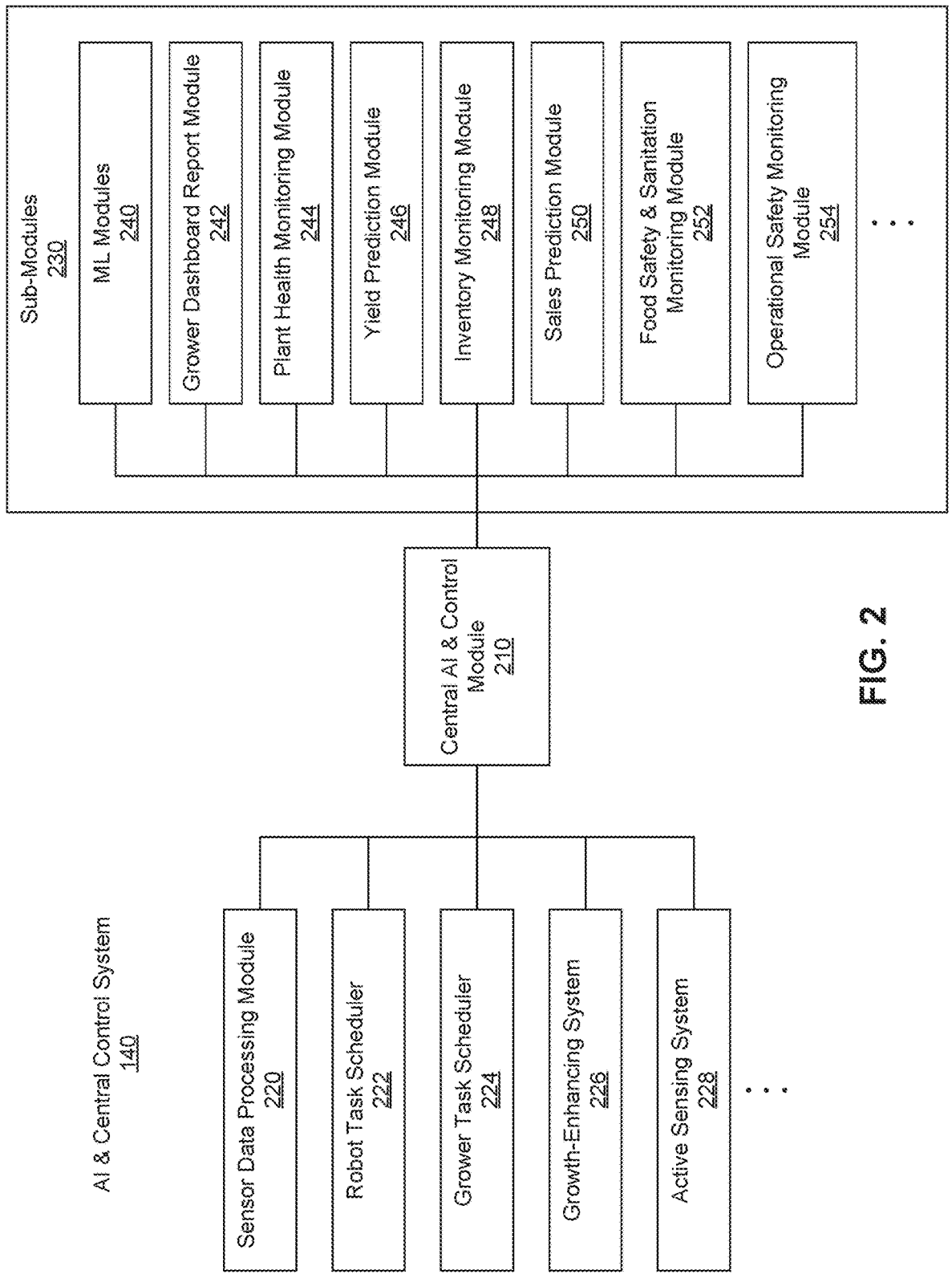
FIG. 2 illustrates a block diagram of the artificial intelligence (AI) & central control system 140, according to one embodiment.

FIG. 2 illustrates a block diagram of the AI & central control system 140, according to one embodiment. The AI & central control system 140 includes a central AI & control module 210, a sensor data processing module 220, a robot task scheduler 222, a grower task scheduler 224, a growth-enhancing system 226, an active sensing system 225, one or more machine learning (ML) modules 240, a grower dashboard report module 242, a plant health monitoring module 244, a yield prediction module 246, an inventory monitoring module 248, a sales prediction module 250, a food safety & sanitation monitoring module 252, and an operational safety monitoring module 254.

The central AI & control module 210 compiles real-time data across the farm from various sensors and control modules. The central AI & control module 210 processes and sends the relevant data to one or more submodules 230 that make various decisions to control the farm operation and learn to make predictions. The outputs of these submodules 230 are compiled and communicated to relevant systems to control the greenhouse. The AI-driven software system uses data from sensors 150 and other operational components to move materials, change the climate condition, schedule other operations.

In one example, based on plant conditions, pest management, and climate condition, the AI & central control system 140 directs the mobile carrier system 112A to move one or more plants, apply more nutrients, change the lighting, etc. In another example, the AI & central control system 140 checks the inventory status and production schedule of the farm and determines how to control the climate, lighting, CO2, irrigation, nutrient system, to improve the plant health and yield to meet the production schedule.

The sensor data processing module 220 processes various raw data and converts the raw data into formats that can be stored and used by various modules.

The robot task scheduler 222 determines various tasks to be performed by robots 112 based on real-time data. The robot task scheduler 222 further schedules the tasks among the available robots. 112. For example, tasks include harvesting, monitoring, transporting and other tasks relevant to farm or greenhouse operations.

The grower task scheduler 224 determines various tasks to be performed by growers (e.g., human operators) based on the real-time data. The grower task scheduler 224 further schedules the tasks among available growers. In some embodiments, the grower task scheduler 224 adapts to a human labor schedule and constrains the scheduling of the tasks and other operations of the farm or greenhouse accordingly.

The growth-enhancing system 226 determines operations that aid the growth of crops, such as irrigation, providing CO2, nutrients, lighting, humidity, airflow, etc.

The active sensing system 228 directs the robots 112 to collect data to monitor individual plants, fruits, and all sites of the greenhouse. The active sensing system 228 additionally collects data from sensors 150 ubiquitously installed in the farm or greenhouse.

In some embodiments, the active sensing system 228 collects, directly or indirectly, data that can be used to understand the growth pattern, condition, and quality of crops from their seed stage to post-harvesting and delivery to the final destination. Additionally, the active sensing system 228 collects data to monitor and analyze the use of machines, human operators, and field workers and their impact on the growth pattern, condition, and quality of crops from their seed stage to post-harvesting and delivery to the final destination. Moreover, the active sensing system 228 monitors any emergency situations including natural/human-involved accidents, microclimate changes, pest and insect occurrence, change in crop quality, sanitary issue.

The ML modules 240 trains and deploys various machine learning models. The ML modules 240 take a set of raw data, labeled and unlabeled target outputs, and train a set of ML models. The trained ML models can be utilized by other components, e.g. robots, control modules, and prediction modules. The process for training the ML models is described below in conjunction with FIGS. 4 and 5. The process for using the ML models is described below in conjunction with FIGS. 6,7, and 9-12.

The grower dashboard report module 242 compiles, analyzes, and reports the summary of raw data. The report generated by the grower dashboard report module 242 may include results from other monitoring and prediction modules.

The plant health monitoring module 244, using ML and AI, monitors plant health, detects any preconditions and conditions regarding pest and disease. The plant health monitoring module 244 may suggest appropriate actions, e.g. pest management routine, to be taken. In some embodiments, the plant health monitoring module 244 receives images of plants and applies a ML model based on the images to detects pests or diseases of one or more plants. For example, the plant health monitoring module 244 may receive a set of images of a plant depicting the condition of the plant over time to determine the current condition of a plant or to predict a change in the condition of the plant. Moreover, the plant health monitoring module 244 may receive sensor data from one or more sensors (e.g., stationary sensors or mobile sensors) and lab data for tests conducted for one or more plants in the farm or greenhouse, and applies the ML model based on the received sensor data and lab data. In some embodiments, the health monitoring module 244 detects pests or diseases for a plant based on information about other plants that are in close proximity to the plant being analyzed.

The yield prediction module 246, using ML and AI, predicts yields of the farm or greenhouse, either as its subsets or as a whole, for a given time frame.

The inventory monitoring module 248 monitors the inventory of fresh produce of the farm or greenhouse.

The sales prediction module 250 predicts upcoming sales based on the history of sales data and any other data provided, such as actual sales order(s) or future sales order(s). The sales prediction module 250 may use ML models trained internally.

The food safety & sanitation monitoring module 252 monitors various operating parts of the farm or greenhouse, actions performed by humans and robots, and crops with respect to food safety. In some embodiments, the food safety & sanitation monitoring module 252 may be attached on the robotic platforms for real-time monitoring and direct interaction with the farm or greenhouse.

The operational safety monitoring module 254 monitors operations of the farm, which may or may not involve human, mechanical, or robotic operations, to monitor any accidents that may be hazardous, cause a delay in operation, or result in a change in crop quality or yield.

Mobile Carrier System (Robots)

Figure 3:
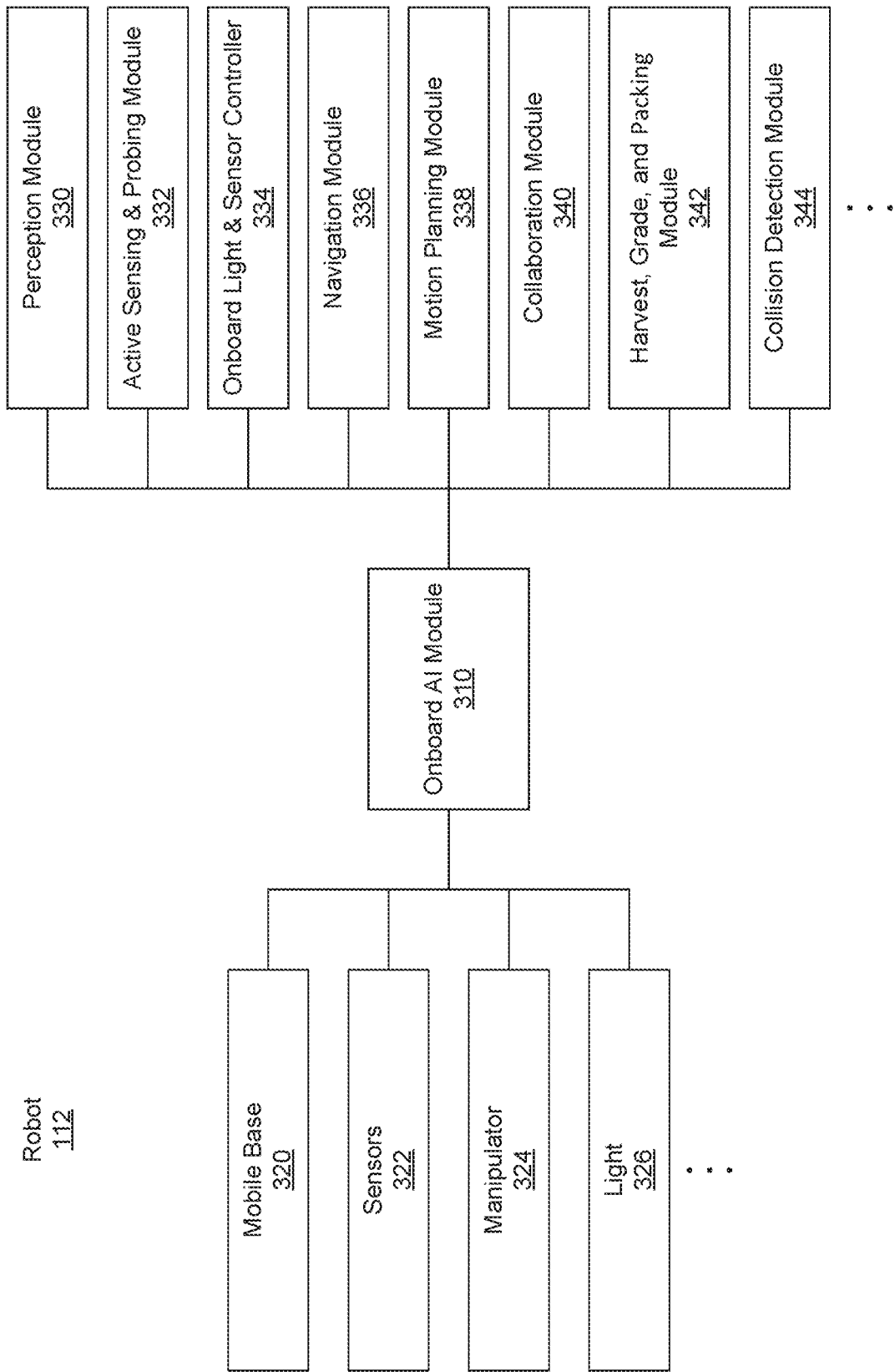
FIG. 3 illustrate a block diagram of a mobile carrier system or a robot 112, according to one embodiment.

FIG. 3 illustrate a block diagram of a mobile carrier system or a robot 112, according to one embodiment. Each robot includes an onboard AI module 310, a mobile base 320, one or more sensors 320, one or more manipulators 324, lights 326, a perception module 330, an active sensing & probing module 332, an onboard light & sensor controller 334, a navigation module 336, a motion planning module 338, a collaboration module 340, a harvest, grade, and packing module 342, and a collision detection module 344.

Robots 112 provide dense, directed monitoring of plants and may directly interact with plants as needed, performing various operations such as sensor measurements, pruning, harvesting, taking pictures, etc. Each robot 112 has its own onboard sensors 352 and an onboard AI system 310, and communicates with the AI & central control system 140.

Upon deployment by the AI & central control system 140 that defines a set of high-level tasks to be performed by the robot 112, the onboard AI module 310 of the robot 112 makes real-time decisions on the specific actions that should be taken.

In some embodiments, the robots 112 handle various objects in farm operation, including trays, plants, gutters, nutrient solutions, water, etc. Moreover, the robots 112 retrieve, store, and transport one or more objects that may or may not carry plants, seeds, and nutrients, with one or more vertical and horizontal level of access. The robots 112 have an automated retrieval system that can retrieve and place materials from multiple levels. In some embodiments, two or more robots 112 collaboratively work together to retrieve, store, and transport one or more objects that may or may not carry plants, seeds, and nutrients, with one or more vertical and horizontal levels of access.

The manipulators 354, such as a robotic arm with specially designed grippers and manipulation mechanisms, are used for retrieving, storing, and transporting one or more objects that may or may not carry plants, seeds, and nutrients. In some embodiments, the robots may include multiple manipulators to simultaneously retrieve, store, and transport multiple items. The robots 112 may additionally adjust the spacing between items that may carry plants, seeds, and nutrients.

In some embodiments, the robots 112 may actively place and retrieve sensors. The operations may or may not include charging the sensors. The carrier may stay in the place with the sensors attached or place them and leave the retrieval job to a later time.

The sensors 322 for monitoring the status of plants, microclimates, and the general status of the farm or greenhouse. In some embodiments, the sensors are embedded in the robots 112. In other embodiments, the sensors may be attached and detached from the robots. For example, a robot may pick up a specific sensor from a set of available sensors based on instructions received by the central AI & control module 210. Since the robots are able to move around the farm or greenhouse, the sensors being carried by a robot can be used to capture sensor data at various locations around the farm or greenhouse.

The robots 112A include lights for aiding the robot's perception module 330. The perception module 330 detects and recognizes various objects in a scene. In some embodiments, the perception module 330 analyzes images captured by one or more cameras embedded in the robots, radar or LiDAR signals or any other sensor data captured by one or more sensors embedded in the robot to recognize objects in the vicinity of the robot.

The active sensing & probing module 332 uses a set of sensors to capture local data. The onboard light & sensor controller 334 controls lights and various onboard sensors.

The navigation module 336 plans and controls the robot to go from one location to another. In some embodiments, the navigation module 336 uses a positioning system such as a radar or a GPS receiver to determine a current location of the robot, and a map of the farm or greenhouse to identify one or more potential routes to reach a desired destination.

The motion planning module 338 plans and controls the robot's manipulator to perform a set of tasks. In some embodiments, based on the desired pose of the manipulator's end-effector (e.g. a gripper) the motion planning module 338 identifies one or more collision-free trajectories (e.g. a sequence of waypoints) to move the manipulator. In some embodiments, the motion planning module 338 interacts with the collision detection module 344 to identify the one or more collision-free trajectories. For example, for a set of poses of the manipulator associated with a trajectory, the collision detection module 344 determines whether the manipulator would be colliding with an object (e.g., an obstacle) that has been detected to be in the proximity of the robot. That is, the collision detection module 344 may receive the location and size of obstacles around the robot (e.g., as detected by a set of visual sensors and a map) and determines whether the manipulator would overlap with any of the obstacles. If the collision detection module 344 determines that one or more poses associated with a trajectory would result in the manipulator colliding with one or more obstacles, the motion planning module 338 may modify the trajectory to avoid the detected collision. Alternatively, if the collision detection module 344 determines that one or more poses associated with a trajectory would result in the manipulator colliding with one or more obstacles, the motion planning module 338 may discard the trajectory and may generate a new trajectory until a collision-free trajectory is obtained.

The collaboration module 340 plans and controls the robot to perform a task with one or more other robot or human agents. In some embodiments, the collaboration module 340 of a robot communicates with the collaboration module 340 of other robots to coordinate one or more tasks to be performed by the robots.

The harvest, grade, and packing module 342 plans and controls the robot to perform these tasks. In some embodiments, the harvest, grade, and packing module 342 receives images of a product (e.g., a fruit or vegetable produced in the farm or greenhouse) and grades the product based on predefined specification for the product. For example, the harvest, grade, and packing module 342 determines whether a product is ready to be harvested based on a target size, shape, and color of the product. If the harvest, grade, and packing module 342 determines, based on the image of the product, that the size, shape, and color of the product are within a preset tolerance range, the harvest, grade, and packing module 342 instructs a robot to harvest the product.

The collision detection module 344 detects collision across all tasks and applies appropriate collision avoidance or safety mechanism. For example, the collision detection module 344 applies a collision avoidance algorithm based on a set of images captured by one or more cameras or a set of sensor outputs of one or more sensors embedded in the robot. In some embodiments, the collision detection module 344 interacts with other modules (such as the navigation module 336, the motion planning module 338, and the collaboration module 340). For example, the collision detection module 344 interacts with the navigation module 336 to determine whether a trajectory for a robot to move around the farm or greenhouse would result in a collision with an object or obstacle. In another example, the collision detection module 344 interacts with the motion planning module 338 to determine whether the movement of a component of a robot (e.g., a manipulator 324) would result in a collision with an object or obstacle. In yet another example, the collision detection module 344 interacts with the collaboration module 340 to determine the interaction between two or more robots would result in a collision between the two or more robots.

ML Models Training

Figure 4:
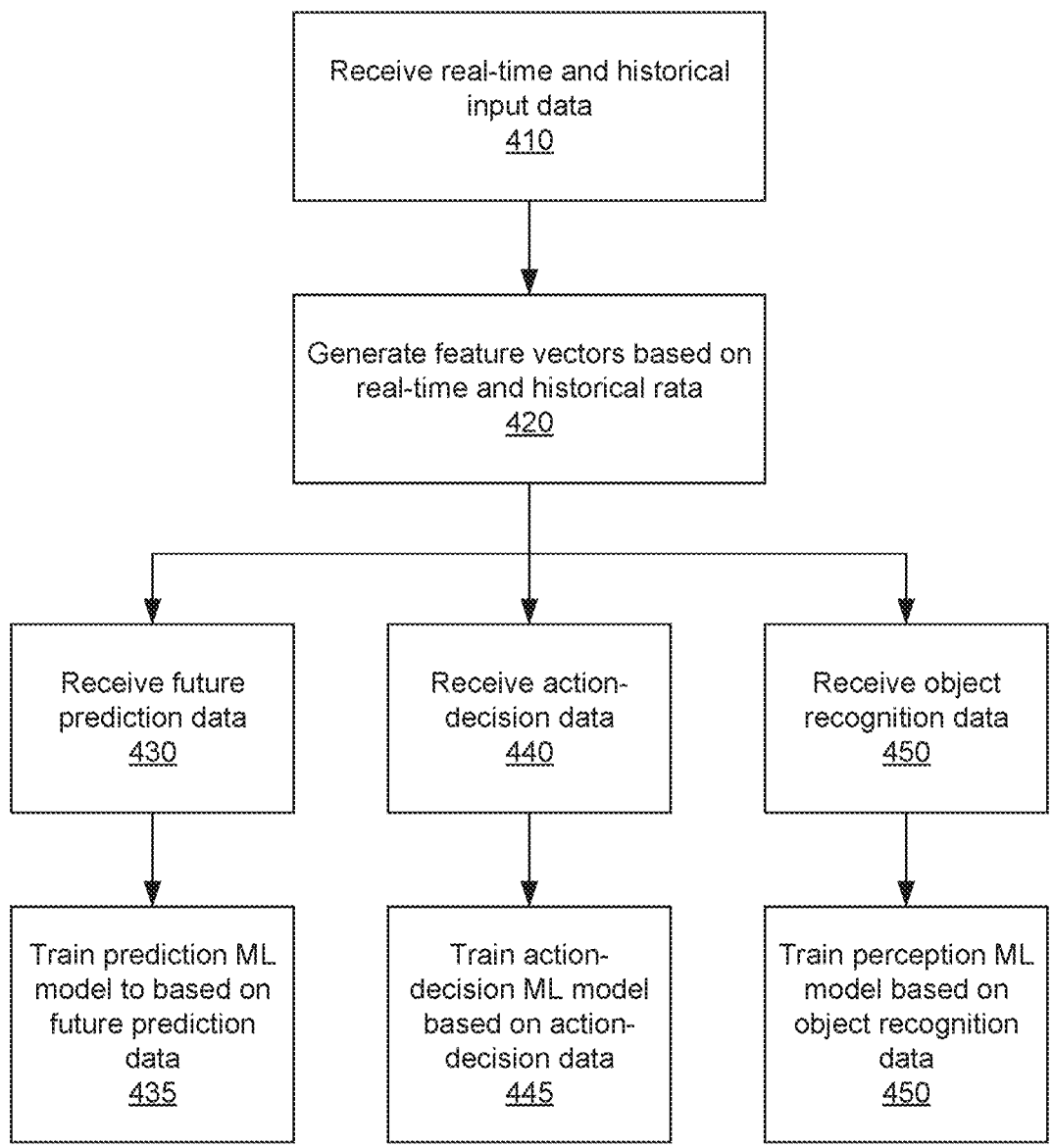
FIG. 4 illustrate a flow diagram of a process for training one or more ML models, according to one embodiment.
Figure 5:
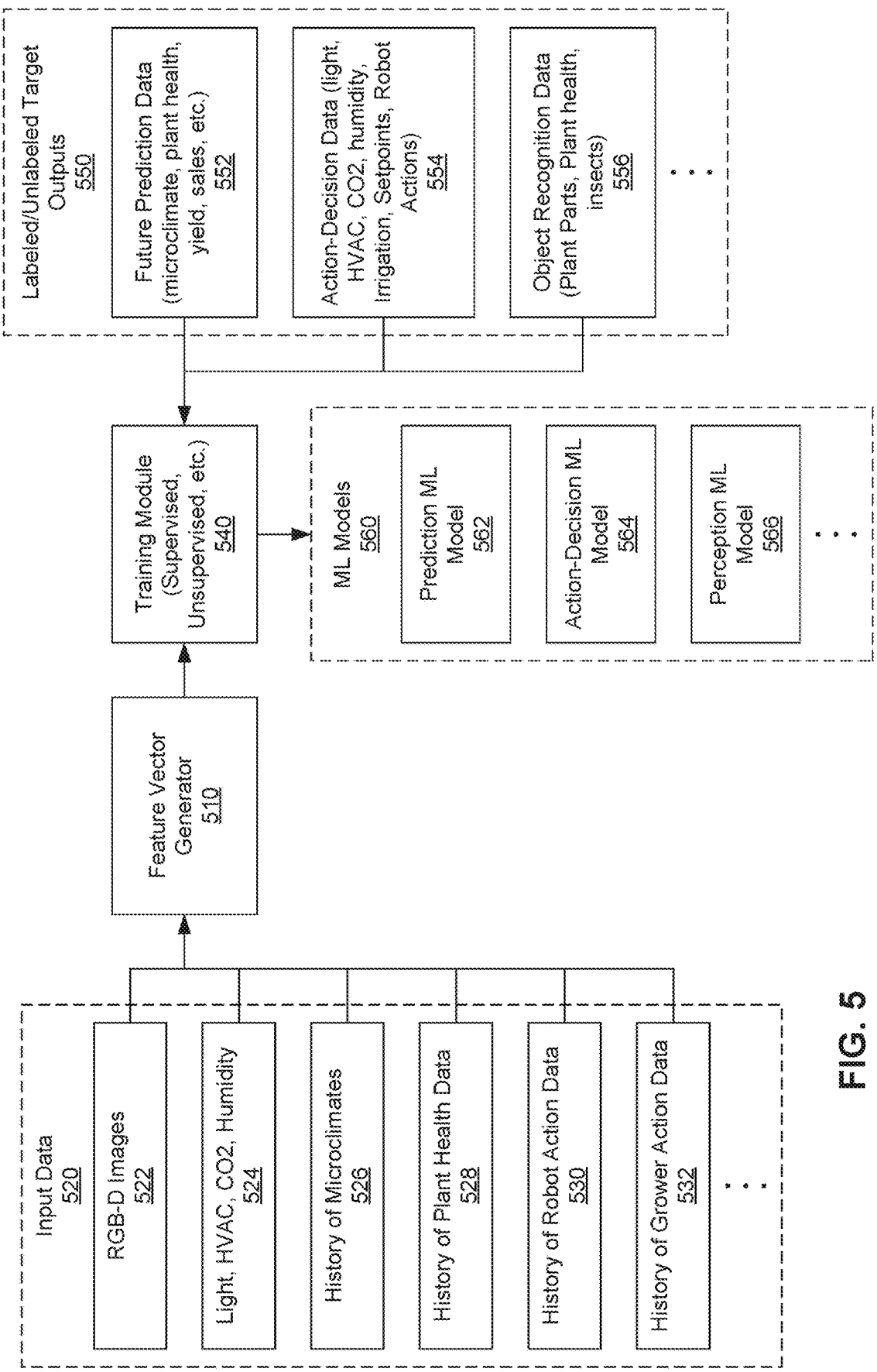
FIG. 5 illustrate a diagram training a set of ML models, according to one embodiment.

FIG. 4 illustrate a flow diagram of a process for training one or more ML models, according to one embodiment. FIG. 5 illustrate a diagram training a set of ML models, according to one embodiment.

A ML training module receives 410 in a set of inputs 520 to train each of the ML models used by the autonomous greenhouse control system 100. The set of inputs 520 include real-time data collected in the farm or greenhouse (e.g., from the sensors attached to the robots 112 and sensors 150 statically placed across the greenhouse). In addition, the input data 520 includes historical data that is accumulated over time (e.g., history of temperature over a particular region of the greenhouse). The types of input data 520 include RGB-Depth images 522, Light, HVAC, $CO_2$, humidity data 524, irrigation and microclimates historical data 526, plant health data 528, robot action data 530, grower actions data 532, etc. Based on the received input data, a set of feature vectors are generated 420.

The ML training module additionally receives a set of target outputs 550. The target outputs 550 are used for training the ML models 560 used by the autonomous greenhouse control system 100. In some embodiments, one or more ML models trained to optimize a specific result (e.g., maximize or minimize the output) instead of trying to achieve a target output.

In some embodiments, as part of the target outputs 550, the ML training module receives 430 future prediction data 552. The future prediction data 552 includes information such as plant health, yield, sales in the near future (e.g., with the time span varying from a few hours to several weeks).

Additionally, as part of the target outputs 550, the ML training module receives 440 action-decision data 554. The action-decision data 554 includes information about actions to be performed by robots, growers, workers, or the autonomous greenhouse control system 100 to achieve a target objective (e.g., yield). In some embodiments, the actions by the autonomous greenhouse control system 100 include schedules and set points for light, temperature, $CO_2$, humidity, and irrigation. Moreover, action by robots may include harvesting, pruning, taking sensor measurements, etc.

In addition, as part of the target outputs 550, the ML training module receives 450 object recognition data 556. The object recognition data 556 includes information (e.g., images) for recognizing objects such as plant parts, fruits, packing systems, humans, insects, pests, and plant diseases.

Using the target outputs 550, the ML training module trains one or more ML models 560. For example, based on the future prediction data 552, the ML training module may train 435 a prediction ML model 562. In addition, based on the action-decision data 554, the ML training module may train 445 an action-decision ML model 564. Moreover, based on the object recognition data 556, the ML training module may train 455 a perception ML model 566.

ML Models Application

Figure 6:
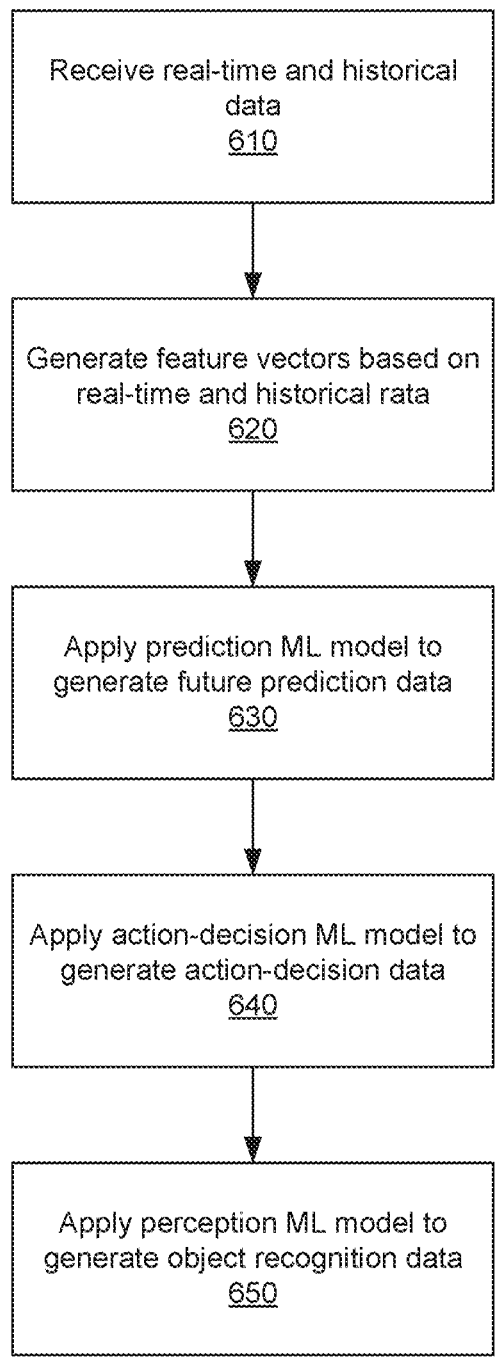
FIG. 6 illustrates a flow diagram of a process for applying one or more ML models, according to one embodiment.
Figure 7:
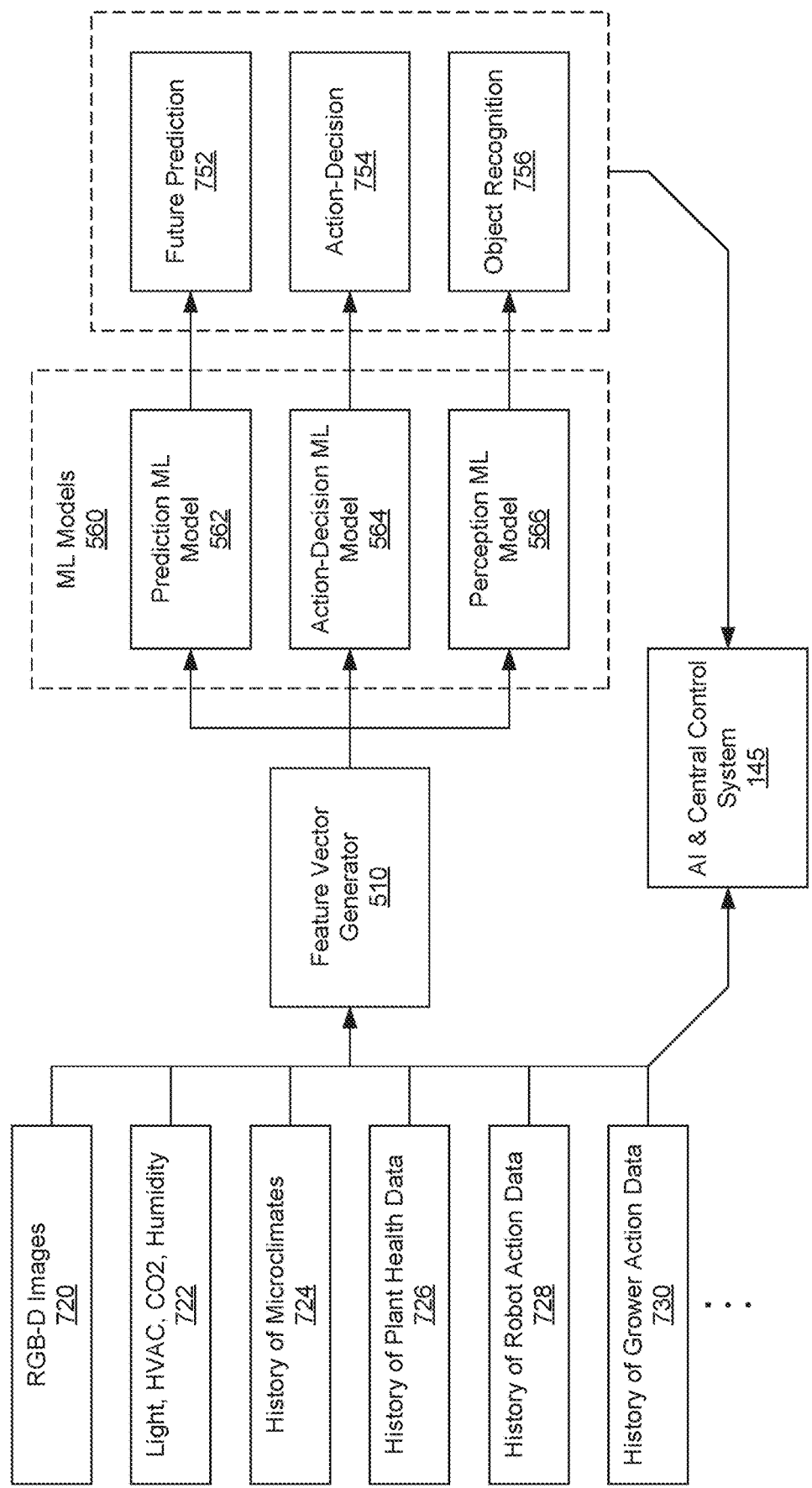
FIG. 7 illustrates a diagram a set of ML models, according to one embodiment.

FIG. 6 illustrates a flow diagram of a process for applying one or more ML models, according to one embodiment. FIG. 7 illustrates a diagram a set of ML models, according to one embodiment. Although in the example of FIG. 7, the various ML models are used by the AI & central control system 145, it is understood that the ML model may also be used by other systems such as the onboard AI module 310 of a robot 112.

The ML module 240 receives 610 a set of inputs. The set of inputs may include real-time and historical data collected in the farm or greenhouse. For example, real-time data includes images 720, and environmental data 722 such as light, HVAC, CO2, and humidity information captured by one or more sensors 150. Additionally, historical data includes a history of microclimates 724, a history of plant health 726, a history of robot actions 728, and a history of grower actions 730.

Based on the received inputs, the feature vector generator 510 generates 620 a set of feature vectors. The set of feature vectors are then provided to the ML models 560 to allow the ML models 560 to generate a corresponding prediction. For example, the prediction ML model 562 is applied 630 on one or more of the feature vectors to generate a future prediction 752. Similarly, the action-decision ML model 562 is applied 640 on one or more of the feature vectors to generate an action-decision output 754. In another example, the perception ML model 566 is applied on one or more of the feature vectors to generate an object recognition data 756.

In some embodiments, the future prediction data 752, the action-decision data 754, and the object recognition data 756 is provided to the AI & central control system 145. The AI & central control system 145 generates one or more outputs for controlling a component of the autonomous greenhouse control system 100 based on the received data. For example, the autonomous greenhouse control system 100 controls one or more robots 112 to perform a set of actions based on the values of the future prediction data 752, the action-decision data 754, and the object recognition data 756. Similarly, the autonomous greenhouse control system 100 may change an environmental parameter of the farm or greenhouse (e.g., temperature, light, humidity, etc.) based on the value of the future prediction data 752, the action-decision data 754, and the object recognition data 756.

In some embodiments, the AI & central control system 145 uses the future prediction data 752 to alert a grower or control the environment of the farm or greenhouse. For example, if the future prediction data 752 generated using the prediction ML model 562 is outside a predefined range, the AI & central control system 145 may alert the grower and control the environment to take preventive measures. Moreover, in some embodiments, the AI & central control system 145 uses the action-decision data 754 (e.g. change in temperature setting) to directly to control the farm or greenhouse, or to send a set of recommendation to the grower to provide the grower with information on how to control the farm or greenhouse.

Figure 9:
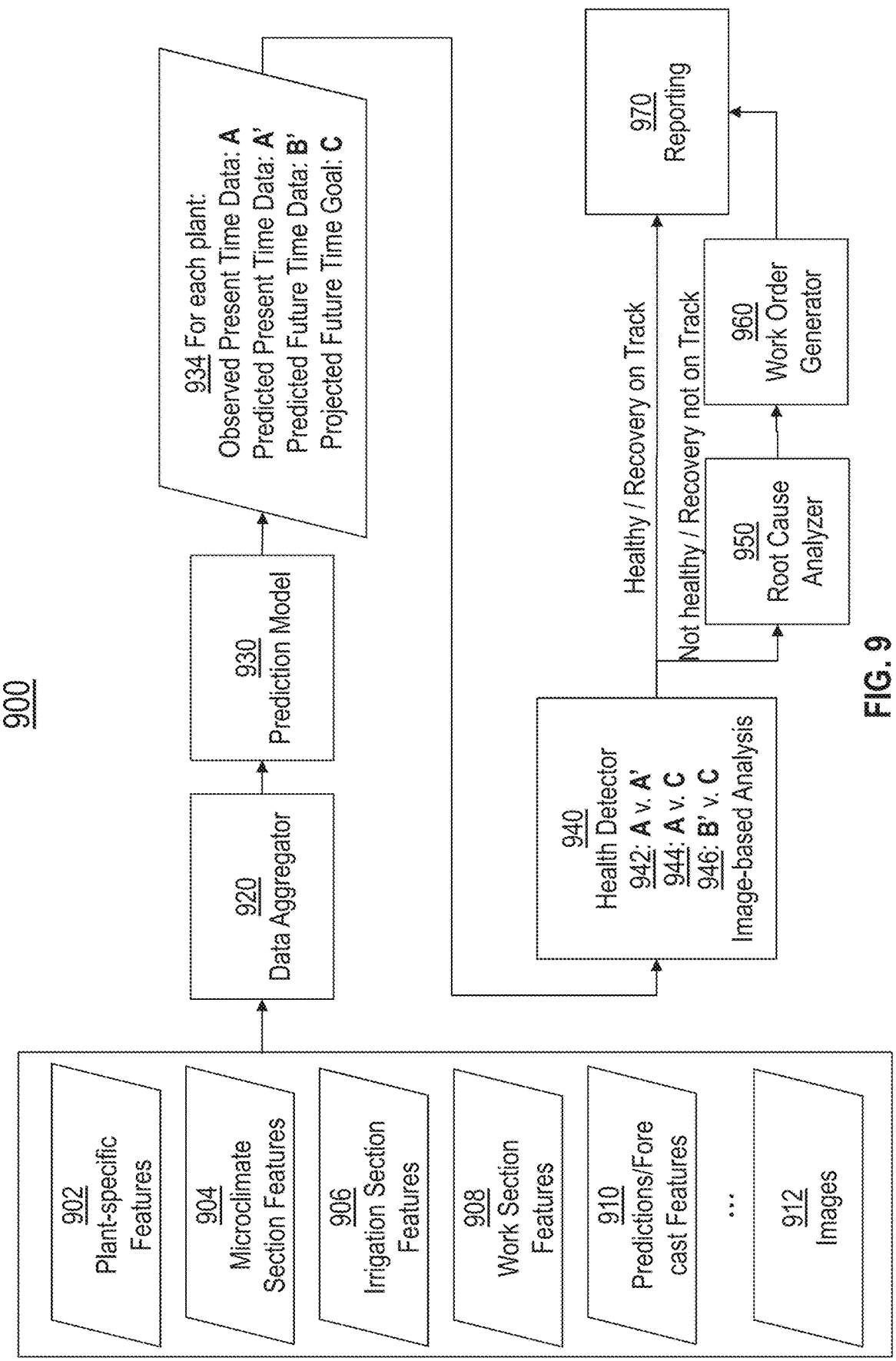
FIG. 9 illustrates an exemplary process for predicting and managing plant health, in accordance with some embodiments.

FIG. 9 illustrates an exemplary process 900 for predicting and managing plant health, in accordance with some embodiments. In some embodiments, the process 900 may be performed using the plant health monitoring module 244. As described herein, the plant health monitoring module can take into account various features of a particular plant or a group of plants to determine whether the plant(s) require attention, which actions are needed to meet the production goals, and work orders that take into account of the cost and benefits associated with each action.

Process 900 is performed, for example, using one or more electronic devices implementing a software platform. In some examples, process 900 is performed using a client-server system, and the blocks of process 900 are divided up in any manner between the server and one or more client devices. Thus, while portions of process 900 are described herein as being performed by particular devices of a client-server system, it will be appreciated that process 900 is not so limited. In other examples, process 900 is performed using only a client device or only multiple client devices. In process 900, some blocks are, optionally, combined, the order of some blocks is, optionally, changed, and some blocks are, optionally, omitted. In some examples, additional steps may be performed in combination with the process 900. Accordingly, the operations as illustrated (and described in greater detail below) are exemplary by nature and, as such, should not be viewed as limiting.

With reference to FIG. 9, an exemplary system (e.g., one or more electronic devices) can receive input data associated with one or more plants (e.g., one or more plants housed in the same greenhouse). The input data may be at least partially collected using any of the above-described data collection components, such as the active sensing system 228. The data can include one or more plant-specific features 902, one or more microclimate section features 904, one or more irrigation section features 906, one or more work section features 908, one or more predictions/forecast features 910, one or more images 912. It should be understood that the foregoing list of input data is merely exemplary. There may be fewer, additional, or different features, for instance, that can be inputted and analyzed by the system.

The plant-specific features 902 comprise a plurality of features that are specific to an individual plant. In some embodiments, the plant-specific features can include information related to the individual plant, such as information related to flower(s), young fruit(s), mature fruit(s), overripe fruit(s), mal-pollination flower(s), mal-shaped fruit(s), pest damage(s), on-plant pest(s), leave(s), canopy height, leaf and fruit discoloration, senescence and brown leave(s), inner canopy temperature, over canopy temperature, leaf area index, etc. For example, an exemplary plant-specific feature value can be a numeric value indicative of the number of flowers on the individual plant. As another example, an exemplary plant-specific feature value can be a binary value indicative of whether the individual plant suffers from a particular type of pest damage.

In some embodiments, the plant-specific features 902 include information about the individual plant associated with a particular time. In some embodiments, the plant-specific features 902 include information about the individual plant associated with a plurality of time points. For example, the plant-specific 902 features may include time-series data comprising feature values corresponding to the plurality of time points (e.g., daily counts of flowers for the past 100 days). In some embodiments, the plant-specific features 902 include features related to the initial conditions of the individual plant, such as the cultivar type, transplant date, plant state at the time of transplant (e.g., crown diameter, number of leaves, root length, canopy height).

The microclimate section features 904 include features specific to a section of an agricultural location (e.g., a greenhouse), where the plants in the section experience the same or approximately the same microclimate characteristics (e.g., temperature, humidity, light). A microclimate section may not be a continuous physical area, but can rather include a plurality of areas in which the plants experience the same or approximately the same microclimate characteristics. A microclimate section can be defined by a user or automatically identified by the system (e.g., based on sensors in the greenhouse). In some embodiments, the microclimate section features can include information related to a particular microclimate section, such as information related to temperature, humidity, light, pest count per section per pest type, $CO_2$, etc.

In some embodiments, the microclimate section features 904 include information about a microclimate section associated with a particular time. In some embodiments, the microclimate section features 904 include information about the microclimate section associated with a plurality of time points. For example, the microclimate section features 904 may include time-series data comprising feature values corresponding to the plurality of time points (e.g., daily temperature in the section for the past 100 days).

The irrigation section features 906 include features specific to a section of an agricultural location (e.g., a greenhouse), where the plants in the irrigation section share the same or approximately the same irrigation history. A irrigation section may not be a continuous physical area, but can rather include a plurality of areas in which the plants experience the same or approximately the same irrigation history. An irrigation section can be defined by a user or automatically identified by the system (e.g., based on the layout of the irrigation system in a greenhouse). For example, a whole row or a set of rows in a greenhouse may share the same nutrition schedule and irrigation schedule because they are all connected. In some embodiments, the irrigation section features can include information related to a particular irrigation section, such as information related to nutrient injection history, incoming nutrient(s) and outgoing nutrient(s), leachate, electrical conductivity (EC), and pH.

In some embodiments, the irrigation section features 906 include information about an irrigation section associated with a particular time. In some embodiments, the irrigation section features 906 include information about the irrigation section associated with a plurality of time points. For example, the irrigation section features 906 may include time-series data comprising feature values corresponding to the plurality of time points (e.g., daily nutrient values in the section for the past 100 days).

The work section features 908 include features specific to a section of an agricultural location (e.g., a greenhouse), where the plants in the work section share the same work history. A work section may not be a continuous physical area, but can rather include a plurality of areas in which the plants experience the same or approximately the same work history. In some embodiments, the work section features can include information related to a particular work section, such as information related to harvesting, cleaning, pruning, pesticide, foliar fertilizer histories in the work section.

In some embodiments, the work section features 908 include information about a work section associated with a particular time. In some embodiments, the work section features 908 include information about the work section associated with a plurality of time points. For example, the work section features 908 may include time-series data comprising feature values corresponding to the plurality of time points (e.g., daily work activities in the section for the past 100 days).

Predictions/forecast features 910 can include data that is derived rather than observed. For example, the system can predict or forecast what a plant in a greenhouse would experience at a particular time given known external conditions and known conditions about the greenhouse. For example, based on a known external temperature from the weather forecast and known characteristics of the temperature regulation system in the greenhouse, the system can generate a predicted temperature that a plant in the greenhouse would experience. As another example, based on a known external weather forecast (e.g., cloudy) and known characteristics of the lighting system in the greenhouse, the system can generate a predicted light level that a plant in the greenhouse would experience. It should be appreciated that the system can generate predictions/forecasts for any of the features described herein.

Images 912 can include one or more images related to one or more plants, such as an image of a specific portion of a plant, an image of multiple plants, an image of an area in the greenhouse, etc. In some embodiments, images are captured at a particular time. In some embodiments, the images are captured at a plurality of time points (e.g., daily images of a plant for the past 100 days).

FIG. 10 illustrates an exemplary portion of input data of the system, in accordance with some embodiments. In some embodiments, the system may be configured to analyze N number of plants (e.g., N plants in the same greenhouse). Accordingly, plant-specific features 902 can be provided for each plant of the N plants. As shown, for Plant 1, feature values of plant-specific features 902 may include feature values 1002*a*; for Plant 2, feature values of plant-specific features 902 may include feature values 1002*b*; . . . ; for Plant N, feature values of plant-specific features 902 may include feature values 1002*z*.

If two plants are in the same microclimate section, the two plants would share the same microclimate section feature values. In the depicted example in FIG. 10, if Plant 1 and Plant N are in the same microclimate section, feature values 1004*a* and feature values 1004*z* would be identical. Similarly, if two plants are in the same irrigation section, the two plants would share the same irrigation section feature values. In the depicted example in FIG. 10, if Plant 1 and Plant N are in the same irrigation section, feature values 1006*a* and feature values 1006*z* would be identical. Similarly, if two plants are in the same work section, the two plants would share the same work section feature values. In the depicted example in FIG. 10, if Plant 1 and Plant N are in the same work section, feature values 1008*a* and feature values 1008*z* would be identical.

Turning back to FIG. 9, the system can aggregate the various input data via a data aggregator 920. For example, the data aggregator can aggregate plant-specific features 902, microclimate section features 904, irrigation section features 906, work section features 908, and predictions/forecast features 910 into a multi-dimensional matrix of feature values.

With reference to FIG. 9, a prediction model 930 can receive the aggregated input data and output per-plant predictions of one or more output features for a future time (e.g., one week later, two months later, three months later). For example, if the system receives input data related to N plants, the prediction model 930 can be used to predict output features for each plant of the N plants.

The output features provided by the prediction model 930 may include: sellable yield, flower counts, sellable fruit counts, weight of each fruit, flower-to-fruit conversion ratio, canopy height, stem length, biomass, number of leaves, leaf area index, etc. It should be understood that the input features and the output features may overlap. In some embodiments, the prediction model 930 can be configured to output an array of predicted output feature values for each plant.

The prediction model 930 may include one or more statistical or machine-learning models. In some embodiments, the prediction model 930 includes a supervised machine-learning model, a multi-modal Gaussian process regression model, a non-linear regression model, a process-driven model, a residual-based machine-learning model, a weight-based machine-learning model, a generative-adversarial machine-learning model, or any combination thereof. The prediction model may be part of the ML modules 240 as described above.

In some embodiments, the non-linear regression model includes high-dimensional non-linear parametric functions. Given the history of plant feature, nutritional inputs, and climate conditions across many plants across various greenhouses, the model parameters can be tuned to best predict future plant features.

In some embodiments, the process-driven model includes one or more process-driven models that use crop physiological functions that can simulate the growth of plants given the historical and future inputs (e.g., nutrients, climate conditions, $CO_2$ level, etc.) to the plants and the history of plant features, such as crown diameter, root length, biomass, leaf counts, leaf size, etc. The parameters of the crop physiological functions may be tuned to specific varieties and climate conditions. The functions may output a subset of plant-specific features such as expected fruit yield, fruit counts, size, biomass, canopy height, etc.

In some embodiments, the residual-based machine-learning model includes a data-driven machine-learning model that predicts the gap between process-driven models and the observed data. Multiple process-driven models that each take subset plant features as inputs, or simulate different features of the plants, may be additively combined using weights, which may be pre-determined by a user or learned through data. The output of the combined model may be further added or multiplied with the data-driven machine learning model, where the machine learning model predicts gap between the observed data and predicted output.

In some embodiments, the weight-based machine-learning model includes a weight-based machine learning model that learns to predict weights across process-driven and data-driven models. To predict the timeseries of plant feature, the machine learning model may use a set of deep neural networks, and the structure of these networks may be an artificial recurrent neural network (RNN) or a Long Short-Term Memory (LSTM) architecture. The models may also include Convolutional Neural Networks (CNN) to process various image-based data.

In some embodiments, the generative-adversarial machine-learning model comprises two sets of machine learning models. One model takes history of plant features and X as inputs to generate the prediction features, while the other model classifies to distinguish between generated and observed data. The two models are iteratively trained so that the generative model improves in predicting the observed data closely. Both models may use deep neural networks, non-linear parametrized functions, or crop-physiological functions whose weights can be tuned iteratively.

Turning back to FIG. 9, for each plant, the system can obtain multiple datasets 934, including: Observed Present Time Data A, Predicted Present Time Data A', Predicted Future Time Data B', Projected Future Time Goal C. Each of these datasets is described in detail below. These datasets are at least partially based on the prediction model 930.

Observed Present Time Data A for a plant refers to the observed values of the output features for the plant at the present time (e.g., today, the present week, the present month). This dataset can be obtained by one or more sensors of the present platform (e.g., active sensing system 228) as described herein.

Figure 11:
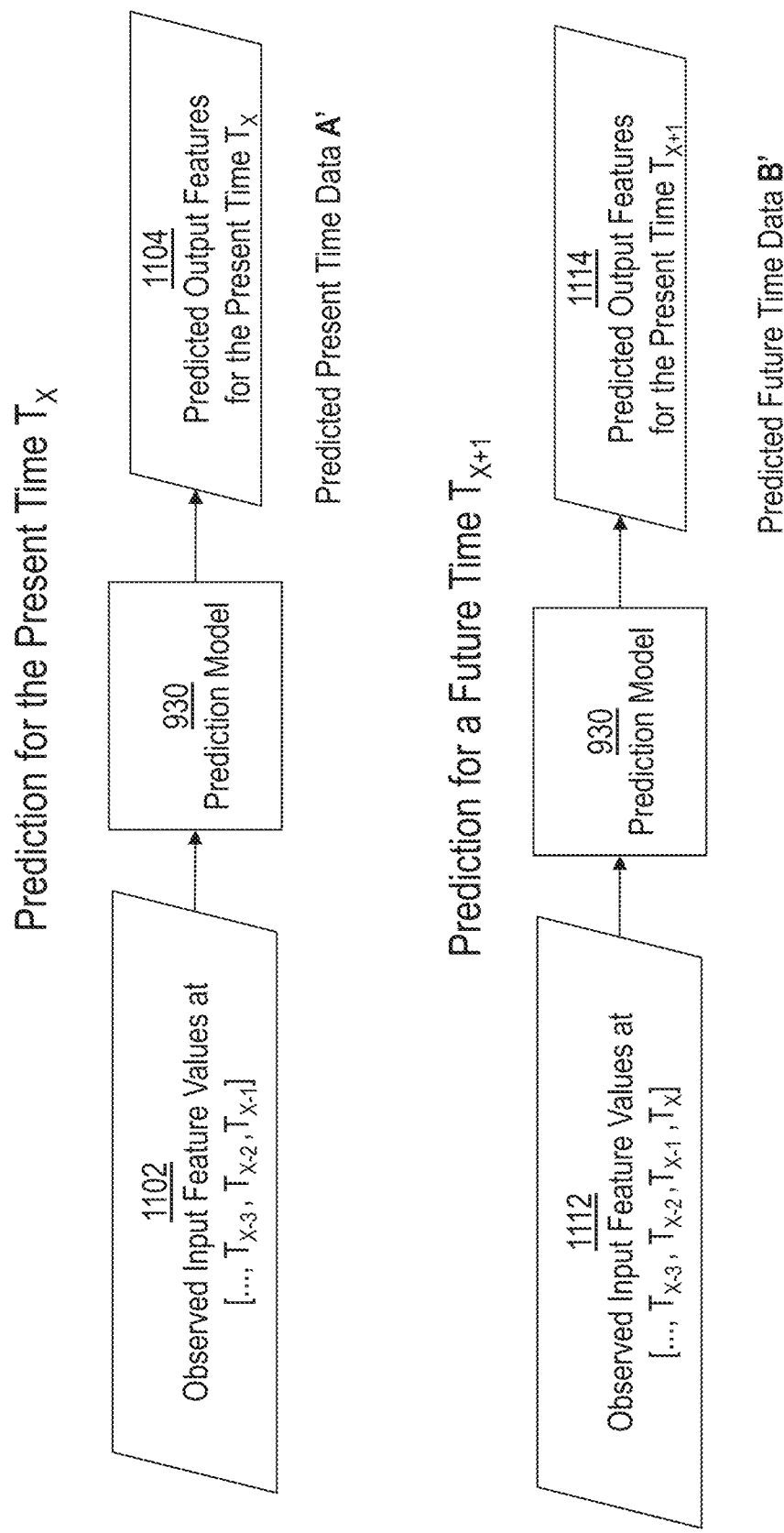
FIG. 11 illustrates exemplary operations of a prediction model, in accordance with some embodiments.

Predicted Present Time Data A' for a plant refers to what the system, based on observed historical data, predicts the values of the output features for the plant to be at the present time. The predicted Present Time Data A' can be obtained using the prediction model 930. With reference to FIG. 11, the system can input observed input feature values 1102 corresponding to past times [ . . . , $T_{x-3}$, $T_{x-2}$, $T_{1-x}$] into the prediction model 930. The prediction model 930 can output the predicted output feature values for the present time $T_x$ 1104 (i.e., A'). In some embodiments, the Predicted Present Time Data A' may be interpreted as "how the plant should look like now."

Predicted Future Time Data B' for a plant refers to what the system, given observed historical data and observed present time data, predicts the values of the output features for the plant to be at a future time. The predicted Future Time Data B' can be obtained using the prediction model 930. With reference to FIG. 11, the system can input observed input feature values 1112 corresponding to past times and the present time [ . . . , $T_{x-3}$, $T_{x-2}$, $T_{x-1}$, $T_x$] into the prediction model 930. The prediction model 930 can output the predicted output feature values for the future time $T_{x+1}$ 1104 (i.e., B'). In some embodiments, the Predicted Future Time Data B' may be interpreted as "how the plant would look like at a future time."

Projected Future Time Goal C refers to the values of the output features for the plant at one or more future times (e.g., a trajectory) in order for the plant to meet production goals. For example, given a set of production goals (e.g., achieving a particular sellable yield in three months), the system can determine what the values of the output features for the plant need to be in a month. In some embodiments, the Projected Future Time Goal C may be interpreted as "how the plant should look like from now to a future time."

The outputs of the prediction model 930 may be inter-related. For example, if a particular plant is predicted to have a high probability of pest issue, the output feature values of the neighboring plants may be adjusted accordingly because the pest issue may propagate to these neighboring plants.

With reference to FIG. 9, the system can detect health issues for each plant using a health detector 940. The health detector 940 is configured to determine whether the plant is diverging from the expected growth trajectory to meet the production goal. The input of the health detector 940 may include the datasets 934, which includes the Observed Present Time Data A, Predicted Present Time Data A', Predicted Future Time Data B', Projected Future Time Goal C.

The health detector 940 may perform a comparison 942 between the Observed Present Time Data A and the Predicted Present Time Data A'. The comparison may be indicative of whether any of the output features as presently observed is significantly different from the system's prediction for the present time based on historical data. In some embodiments, for each output feature, the system can calculate a corresponding difference value between A and A'. The system may compare the difference value against a threshold (e.g., a threshold associated with the output feature) to determine if a significant deviation is present for the output feature. In some embodiments, the system may aggregate the difference values of multiple output features and compare the aggregated value against a threshold.

The health detector 940 may perform a comparison 944 between the Observed Present Time Data A and the Projected Future Time Goal C (e.g., at a time closest to the present time on the trajectory). The comparison may be indicative of whether any of the output features as currently observed is significantly different from what the production plan requires the output feature to be at the present time. A significant difference (e.g., a difference over a predefined threshold) may indicate that the plant health/growth is lagging or outpacing the schedule it should be following. In some embodiments, based on the difference, the system can determine the amount of developmental lag for the plant (e.g., one month lagging). In some embodiments, for each output feature, the system can calculate a corresponding difference value. The system may compare the difference value against a threshold (e.g., a threshold associated with the output feature) to determine if a significant deviation is present for that output feature. In some embodiments, the system may aggregate the difference values of multiple output features and compare the aggregated value against a threshold.

The health detector 940 may perform a comparison 946 between the Predicted Future Time Data B' and the Projected Future Time Goal C. The comparison may be indicative of whether any of the output features as predicted for a future time by the system is significantly different from what the production plan requires the output feature to be at the future time. A significant difference (e.g., a difference over a predefined threshold) may indicate that the plant health/growth will be lagging/outpacing the schedule it should be following. In some embodiments, based on the difference, the system can determine the amount of developmental lag for the plant (e.g., one month lagging). In some embodiments, for each output feature, the system can calculate a corresponding difference value. The system may compare the difference value against a threshold (e.g., a threshold associated with the output feature) to determine if a significant deviation is present for that output feature. In some embodiments, the system may aggregate the difference values of multiple output features and compare the aggregated value against a threshold.

The health detector 940 may perform an image-based analysis to identify issues based on the images 912 of the one or more plants. The detector can include one or more machine-learning models configured to receive an image and detect issues depicted in the image. The issues may include mal-pollination, misshaped flowers/fruits, presence of pest, disease symptoms, plant looking stunted, or any other visually identifiable issues related to the health of a plant. The one or more machine-learning models can be implemented by an object detection algorithm. In some embodiments, the machine-learning model is a trained neural network.

Based on the analyses by the health detector 940, the system can determine if each plant is healthy or not healthy, or whether the plant is tracking the trajectory to meet production goal(s). In some embodiments, the system can determine that a plant is not healthy or not tracking the trajectory based on the comparison 942, the comparison 944, the comparison 946, any issues identified in the image-based analysis, or any combination thereof.

In some embodiments, a plant may be associated with a special status. For example, a disease may have been previously identified and/or a treatment may have been prescribed and applied to a plant, and the plant may be flagged for special monitoring by the system. The treatment(s) can be included as an input feature for the prediction model 930. Accordingly, the prediction model 930 can take account of the treatment(s) when predicting the Predicted Present Time Data A' and Predicted Future Time Data B'. Thus, the comparison 942 (A v. A') can indicate whether the plant's recovery is presently on track, and the comparison 946 (B' v. C) can indicate whether the predicted future matches the recovery growth trajectory. In some embodiments, for a special plant, the system may determine that the plant's recovery is on track if both the comparison 942 and the comparison 946 yield no significant deviations.

With reference to FIG. 9, if the system determines that a plant is healthy, tracking the trajectory, and/or its recovery is on track, the system can output an indication that the plant is healthy or on track to recover using the reporting module 970. The system may also report any results of the above-described analyses, such as any portion of the datasets 902-912, any portion of the datasets 934, any portion of the comparisons 942-946, the image-based analysis, or any combination thereof. In some embodiments, the reporting module 970 is the grower dashboard report module 242. In some embodiments, if the system determines that a plant is healthy, tracking the trajectory, and/or its recovery is on track, the system may continue to optimize a growth plan for the plant, continue to apply existing treatment(s), continue to monitor the plant, prescribe actions appropriate to health plants (e.g., pruning), or any combination thereof.

If, on the other hand, the system determines that the plant is not healthy, lagging the trajectory, or is not on track to recover, the system can perform a root cause analysis using a root cause analyzer 950. The root cause analyzer may receive, as input, any output feature for which deviation is detected from comparison 942, 944, and/or 946. In some embodiments, the root cause analyzer may also receive features 902-912, datasets 934, or any combination thereof.

The root cause analyzer includes a list of candidate root causes that may affect plant health. In some embodiments, the candidate root causes may include: out-of-range temperature, out-of-range humidity, out-of-range lighting, irrigation schedule, irrigation quantity, nutrient composition, virus, disease, pest, etc. In some embodiments, each root cause may be pre-associated with one or more mitigation actions specific to fixing the root cause. Additionally or alternatively, the root cause analyzer may propose one or more lab tests to be performed to obtain more information while treatment is applied.

The root cause analyzer 950 can determine a probability associated with each candidate root cause and identify one or more root causes by comparing the probabilities against a predefined threshold. For each identified root cause, the system can determine the associated one or more mitigation actions to address the root cause.

In some embodiments, the system can predict the effectiveness or importance of a particular mitigation action for a plant by comparing expected plant growth trajectories if the root cause is not fixed vs. some mitigating action is taken. For example, the system can provide input features of a plant, as well as information related to the mitigation action, to the prediction model 930 to obtain predicted output features for a future time if the mitigation action is taken. These predicted output features can be compared against the predicted output features assuming that the mitigation action is not taken on the plant. The differences in the output features (e.g., the difference in sellable fruits, the difference in flower count) can be used to evaluate the effectiveness or importance of the mitigation action. For example, the comparisons may reveal that the plant would be dead in a month if a virus root cause is not addressed, while the plant may recover by itself in a month if a lighting root cause is not addressed.

The root cause analyzer may include one or more machine-learning models. In some embodiments, the root cause analyzer may include a supervised machine learning model that outputs the set of candidate root causes, a decision tree that outputs the candidate root causes based on the input conditions, a plant growth simulator that simulates various conditions (e.g., low irrigation, disease, etc.) that may have resulted in the plant's current condition, imitation learning module that mimics what a grower would have indicated as the root causes, or any combination thereof. In some embodiments, the models are part of the ML modules 240.

With reference to FIG. 9, after the root cause analyzer 950 identifies the root causes and the mitigation actions, the system can generate a work order using a work order generator 960. In some embodiments, the work order generator can receive as input: features 902-912, the identified root causes, the corresponding mitigation actions, the required growth trajectory according to the production plan, the predicted plant growth trajectories as determined by the root cause analyzer 950, the cost and benefit associated with each mitigation action, or any combination thereof.

The work order generator 960 can output one or more work orders for each plant to prescribe the treatments for target plants, including change in irrigation schedule or nutrient (either targeted or global), application of targeted fertilizer or pesticide, removal of the plant, transplanting of a new plant, continued monitoring, lab test, etc. In some embodiments, the system can use the prediction model 930 to predict the growth trajectory of the plant if the work order(s) are implemented.

The work order generator may include one or more machine-learning models configured to generate the work orders. In some embodiments, the work order generator may include a supervised learning or imitation learning model that learns to mimic what a grower would have prescribed, a reinforcement learning model that optimizes the output growth trajectory to match the production plan trajectory as quickly as possible, a decision tree that outputs a set of work orders based on the inputs, or any combination thereof. In some embodiments, the work order generator comprises a weighted decision tree whose tree structure may be initially proposed by expert growers and weights are tuned through experiments to maximize the crop yield and minimize any potential production risk, such as pest issues. In some embodiments, the models can be part of the ML modules 240.

With reference to FIG. 9, after the work orders are generated, the system can output an indication that the plant is not healthy, lagging the trajectory, or not recovering as expected using the reporting module 970. The system may also report any results of the above-described analyses, such as any portion of the datasets 902-912, any portion of the datasets 934, any portion of the comparisons 942-946, results by the root cause analyzer, results by the work order generator (such as the predicted recovery growth trajectory), or any combination thereof. In some embodiments, the reporting module 970 can be the grower dashboard report module 242. In some embodiments, the work orders may be reviewed and adjusted by a human worker.

The system can execute the work orders using one or more robots (e.g., robots 112), one or more growers, or a combination thereof, as described herein. For example, the robot task scheduler 222 determines various tasks to be performed by robots 112 based on the work orders. The robot task scheduler 222 further schedules the tasks among the available robots 112. For example, tasks include harvesting, monitoring, transporting and other tasks relevant to farm or greenhouse operations. As another example, the grower task scheduler 224 determines various tasks to be performed by a human worker (e.g., grower) based on the work orders. The grower task scheduler 224 further schedules the tasks among available growers. In some embodiments, the grower task scheduler 224 adapts to a human labor schedule and constrains the scheduling of the tasks and other operations of the farm or greenhouse accordingly.

Using the system described herein, greenhouses can be efficiently managed with minimal human effort and intervention. The system can closely and constantly monitor the plants in a greenhouse, detect ongoing health issues on a per-plant basis, intelligently identify the appropriate treatment options by taking account of the cost, benefit, and production goals, and administer the treatments using robots in an autonomous manner. Accordingly, the system provides for modular and autonomous greenhouses designed to provide sustainably grown fruits and vegetables. The greenhouses can operate near major cities to create short and efficient supply chains to ensure that fresh fruits are readily available anywhere, enabling consumers to get access to fresh food products.

Figure 12:
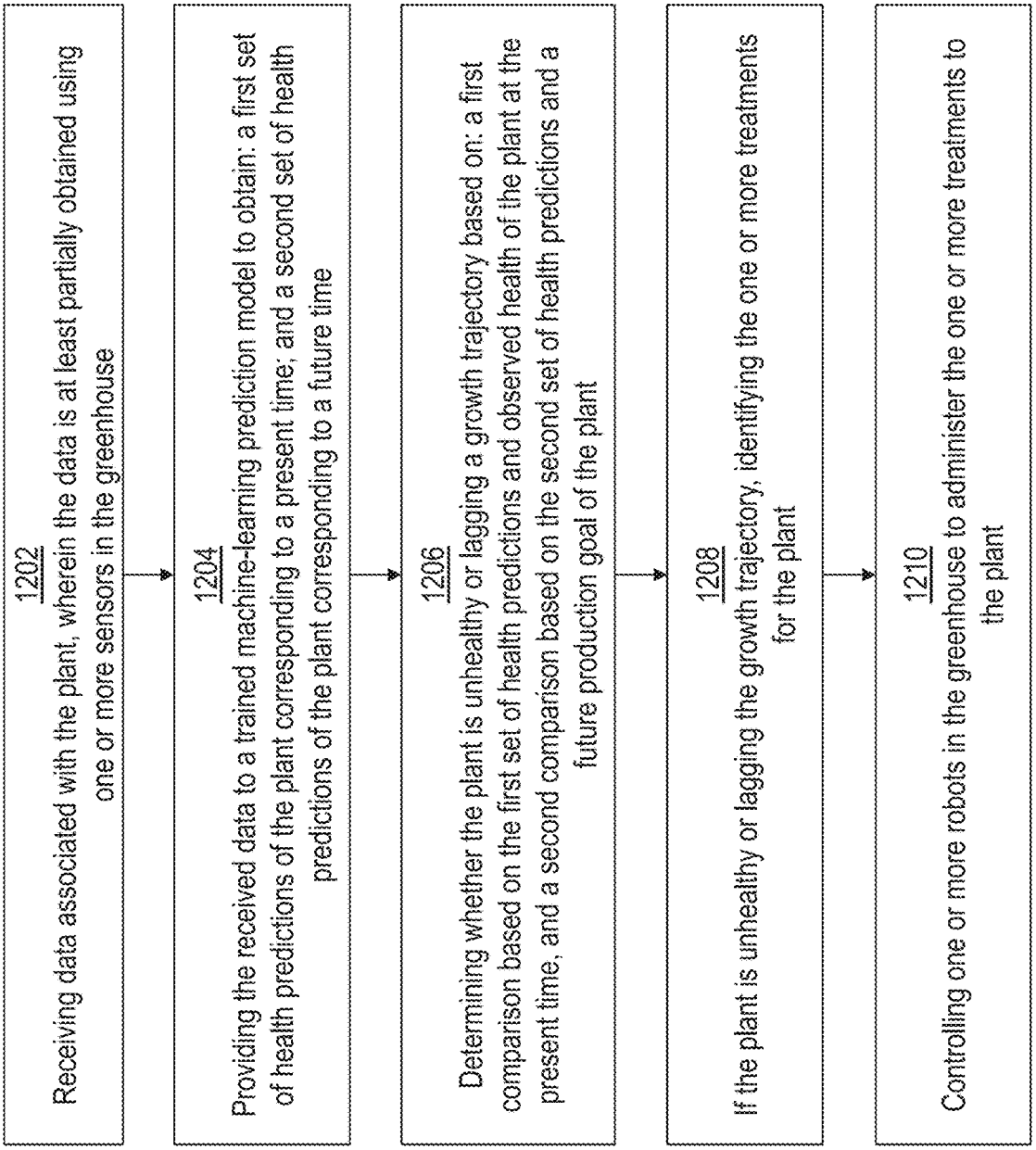
FIG. 12 illustrates an exemplary process for identifying a treatment for a plant, in accordance with some embodiments.

FIG. 12 illustrates an exemplary process 1200 for predicting and managing plant health, in accordance with some embodiments. Process 1200 is performed, for example, using one or more electronic devices implementing a software platform. In some examples, process 1200 is performed using a client-server system, and the blocks of process 1200 are divided up in any manner between the server and one or more client devices. Thus, while portions of process 1200 are described herein as being performed by particular devices of a client-server system, it will be appreciated that process 1200 is not so limited. In other examples, process 1200 is performed using only a client device or only multiple client devices. In process 1200, some blocks are, optionally, combined, the order of some blocks is, optionally, changed, and some blocks are, optionally, omitted. In some examples, additional steps may be performed in combination with the process 1200. Accordingly, the operations as illustrated (and described in greater detail below) are exemplary by nature and, as such, should not be viewed as limiting.

At block 1202, an exemplary system (e.g., one or more electronic devices) receives data associated with the plant, wherein the data is at least partially obtained using one or more sensors in the greenhouse; at block 1204, the system provides the received data to a trained machine-learning prediction model to obtain: a first set of health predictions of the plant corresponding to a present time; and a second set of health predictions of the plant corresponding to a future time; at block 1206, the system determines whether the plant is unhealthy or lagging a growth trajectory based on: a first comparison based on the first set of health predictions and observed health of the plant at the present time, and a second comparison based on the second set of health predictions and a future production goal of the plant; at block 1208, if the plant is unhealthy or lagging the growth trajectory, the system identifies the one or more treatments for the plant; and at block 1210, the system controls one or more robots in the greenhouse to administer the one or more treatments to the plant.

In some embodiments, the one or more treatments comprise: applying a fertilizer to the plant, applying a pesticide to the plant, removing the plant from the greenhouse, transplanting a new plant to replace the plant, performing a lab test on the plant, collecting data on the plant, updating irrigation settings for the plant, updating nutrient settings for the plant, or any combination thereof.

In some embodiments, the trained prediction model comprises: a supervised machine-learning model, a multi-modal Gaussian process regression model, a non-linear regression model, a process-driven model, a residual-based machine-learning model, a weight-based machine-learning model, a generative-adversarial machine-learning model, or any combination thereof.

In some embodiments, the first set of health predictions of the plant is obtained by: obtaining a plurality of historical feature values based on the received data; and providing the plurality of historical feature values to the trained prediction model to obtain the first set of health predictions of the plant.

In some embodiments, the plurality of historical feature values comprises information related to a historical treatment to the plant.

In some embodiments, the second set of health predictions of the plant is obtained by: obtaining a plurality of historical feature values based on the received data; obtaining a plurality of present feature values based on the received data; and providing the plurality of historical feature values and the plurality of present feature values to the trained prediction model to obtain the second set of health predictions.

In some embodiments, determining whether the plant is unhealthy or lagging the growth trajectory is further based on a comparison based on the first set of health predictions and the future production goal of the plant.

In some embodiments, the first set of health predictions and the second set of health predictions are with respect to a plurality of output features.

In some embodiments, the plurality of output features comprises: a sellable yield, a flower count, a sellable fruit count, a weight of a fruit, a flower-to-fruit conversion ratio, a canopy height, a stem length, a biomass, a number of leaves, a leaf area index, or any combination thereof.

In some embodiments, identifying the one or more treatments for the plant comprises: identifying a subset of output features from the plurality of output features based on the first comparison and/or the second comparison; providing information related to the subset of output features to a trained machine-learning root cause analysis model to obtain one or more root causes; identifying one or more mitigation actions based on the one or more root causes; and providing information related to the one or more mitigation actions to a trained machine-learning work order model to obtain the one or more treatments.

In some embodiments, the trained machine-learning root cause analysis model is configured to output a plurality of probabilities associated with a plurality of root causes.

In some embodiments, the one or more root causes are identified based on the plurality of probabilities.

In some embodiments, the trained machine-learning root cause analysis model comprises a supervised model, a decision tree, a plant growth simulator, an imitation learning model, or any combination thereof.

In some embodiments, the trained machine-learning work order model comprises a supervised model, an imitation model, a reinforcement model, a decision tree, or any combination thereof.

In some embodiments, the method further comprises: evaluating, using the prediction model, an effectiveness of the one or more mitigation actions.

In some embodiments, the method further comprises: adjusting the first set of health predictions of the plant based on one or more health predictions of a neighboring plant in the greenhouse.

In some embodiments, the received data comprises information related to: a plurality of plant-specific features, a plurality of microclimate section features, a plurality of irrigation section features, a plurality of work section features, one or more images of the plant, or any combination thereof.

In some embodiments, the method further comprises: if the plant is healthy and tracking the growth trajectory, optimizing a growth plan for the plant, applying an existing treatment to the plant, monitoring the plant, generating a work order to prune the plant, or any combination thereof.

In some embodiments, the data associated with the plant is at least partially obtained using a robot or based on one or more user inputs.

In some embodiments, the method further comprises: assigning one or more tasks to a human worker if the plant is unhealthy or lagging the growth trajectory.

An exemplary system for administering one or more treatments to a plant in a greenhouse comprises: one or more processors; a memory; and one or more programs, wherein the one or more programs are stored in the memory and configured to be executed by the one or more processors, the one or more programs including instructions for: receiving data associated with the plant, wherein the data is at least partially obtained using one or more sensors in the greenhouse; providing the received data to a trained machine-learning prediction model to obtain: a first set of health predictions of the plant corresponding to a present time; and a second set of health predictions of the plant corresponding to a future time; determining whether the plant is unhealthy or lagging a growth trajectory based on: a first comparison based on the first set of health predictions and observed health of the plant at the present time, and a second comparison based on the second set of health predictions and a future production goal of the plant; if the plant is unhealthy or lagging the growth trajectory, identifying the one or more treatments for the plant; and controlling one or more robots in the greenhouse to administer the one or more treatments to the plant.

An exemplary non-transitory computer-readable storage medium stores one or more programs for administering one or more treatments to a plant in a greenhouse, the one or more programs comprising instructions, which when executed by one or more processors of an electronic device, cause the electronic device to: receive data associated with the plant, wherein the data is at least partially obtained using one or more sensors in the greenhouse; provide the received data to a trained machine-learning prediction model to obtain: a first set of health predictions of the plant corresponding to a present time; and a second set of health predictions of the plant corresponding to a future time; determine whether the plant is unhealthy or lagging a growth trajectory based on: a first comparison based on the first set of health predictions and observed health of the plant at the present time, and a second comparison based on the second set of health predictions and a future production goal of the plant; if the plant is unhealthy or lagging the growth trajectory, identify the one or more treatments for the plant; and control one or more robots in the greenhouse to administer the one or more treatments to the plant.

Computing Machine Architecture

Figure 8:
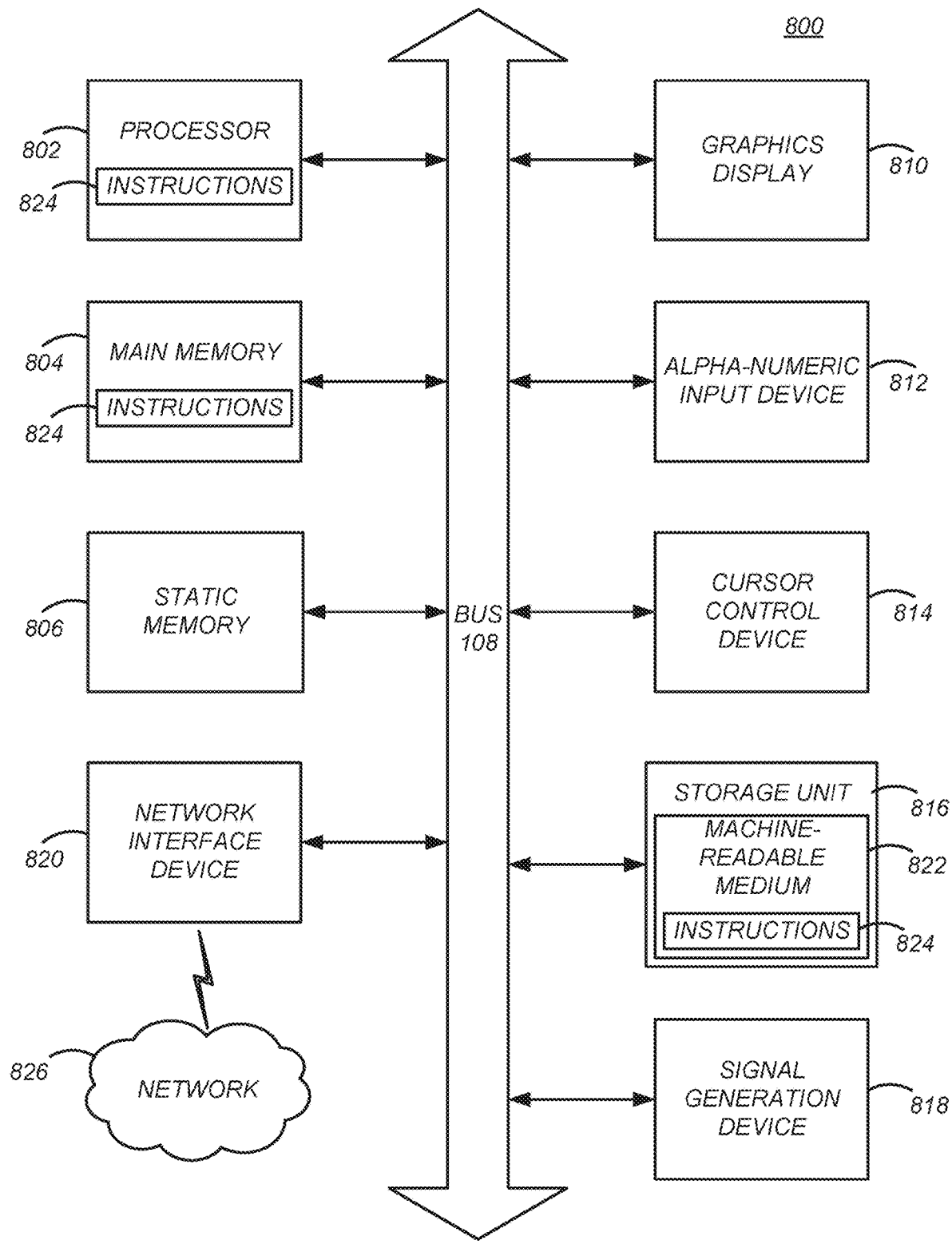
FIG. 8 is a block diagram illustrating components of an example machine able to read instructions from a machine-readable medium and execute them in a processor (or controller).

FIG. 8 is a block diagram illustrating components of an example machine able to read instructions from a machine-readable medium and execute them in a processor (or controller). Specifically, FIG. 8 shows a diagrammatic representation of a machine in the example form of a computer system 800 within which instructions 824 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes a processor 802 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 804, and a static memory 806, which are configured to communicate with each other via a bus 808. The computer system 800 may further include graphics display unit 810 (e.g., a plasma display panel (PDP), a liquid crystal display (LCD), a projector, or a cathode ray tube (CRT)). The computer system 800 may also include alphanumeric input device 812 (e.g., a keyboard), a cursor control device 814 (e.g., a mouse, a trackball, a joystick, a motion sensor, or other pointing instrument), a storage unit 816, a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. The instructions 824 (e.g., software) may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 (e.g., software) may be transmitted or received over a network 826 via the network interface device 820.

While machine-readable medium 822 is shown in an example embodiment to be a single medium, the term "machine-readable medium" should be taken to include a single medium or multiple media (e.g., a centralized or distributed database, or associated caches and servers) able to store instructions (e.g., instructions 824). The term "machine-readable medium" shall also be taken to include any medium that is capable of storing instructions (e.g., instructions 824) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for controlling a farm or greenhouse through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for administering one or more treatments to a plant in a greenhouse, comprising:
   receiving data associated with the plant, wherein the data is at least partially obtained using one or more sensors in the greenhouse;
   providing the received data to a trained machine-learning prediction model to obtain:
      a set of present health feature values of the plant indicating what the health of the plant should be at a present time and generated by the trained machine-learning prediction model, wherein the set of present health feature values is determined based on historical data collected from the plant at one or more times prior to the present time and not based on observed health of the plant at the present time; and
      a set of future health predictions of the plant determined based on real-time data;
      wherein the set of present health feature values and the set of future health predictions are with respect to a plurality of output features;
   determining whether the plant is unhealthy or lagging a growth trajectory based on:
      a first comparison of the set of present health feature values indicating what the health of the plant should be and the observed health of the plant at the present time, and
      a second comparison of the set of future health predictions and a future production goal of the plant;
   if the plant is unhealthy or lagging the growth trajectory, identifying the one or more treatments for the plant, comprising:
      identifying a subset of output features from the plurality of output features corresponding to features for which a threshold deviation was detected in-the first comparison or the second comparison;

providing information related to the subset of output features to a trained machine-learning root cause analysis model to obtain one or more root causes;

identifying one or more mitigation actions based on the one or more root causes; and providing information related to the one or more mitigation actions to a trained machine-learning work order model to obtain the one or more treatments; and controlling one or more robots in the greenhouse to administer the one or more treatments to the plant.

2. The method of claim 1, wherein the one or more treatments comprise: applying a fertilizer to the plant, applying a pesticide to the plant, removing the plant from the greenhouse, transplanting a new plant to replace the plant, performing a lab test on the plant, collecting data on the plant, updating irrigation settings for the plant, updating nutrient settings for the plant, or any combination thereof.

3. The method of claim 1, wherein the trained machine-learning prediction model comprises: a supervised machine-learning model, a multi-modal Gaussian process regression model, a non-linear regression model, a process-driven model, a residual-based machine-learning model, a weight-based machine-learning model, a generative-adversarial machine-learning model, or any combination thereof.

4. The method of claim 1, wherein the set of present health feature values of the plant is obtained by:

obtaining a plurality of historical feature values based on the received data; and providing the plurality of historical feature values to the trained machine-learning prediction model to obtain the set of present health feature values of the plant.

5. The method of claim 4, wherein the plurality of historical feature values comprises information related to a historical treatment to the plant.

6. The method of claim 1, wherein the set of future health predictions of the plant is obtained by:

obtaining a plurality of historical feature values based on the received data; and providing the plurality of historical feature values and the observed health of the plant at the present time to the trained machine-learning prediction model to obtain the set of future health predictions.

7. The method of claim 1, wherein determining whether the plant is unhealthy or lagging the growth trajectory is further based on a comparison based on the set of present health feature values and the future production goal of the plant.

8. The method of claim 1, wherein the plurality of output features comprises: a sellable yield, a flower count, a sellable fruit count, a weight of a fruit, a flower-to-fruit conversion ratio, a canopy height, a stem length, a biomass, a number of leaves, a leaf area index, or any combination thereof.

9. The method of claim 1, wherein the trained machine-learning root cause analysis model is configured to output a plurality of probabilities associated with the one or more root causes.

10. The method of claim 9, wherein the one or more root causes are identified based on the plurality of probabilities.

11. The method of claim 1, wherein the trained machine-learning root cause analysis model comprises a supervised model, a decision tree, a plant growth simulator, an imitation learning model, or any combination thereof.

12. The method of claim 1, wherein the trained machine-learning work order model comprises a supervised model, an imitation model, a reinforcement model, a decision tree, or any combination thereof.

13. The method of claim 1, further comprising: evaluating, using the trained machine-learning prediction model, an effectiveness of the one or more mitigation actions.

14. The method of claim 1, further comprising: adjusting the set of present health feature values of the plant based on one or more health feature values predictions of a neighboring plant in the greenhouse.

15. The method of claim 1, wherein the received data comprises information related to: a plurality of plant-specific features, a plurality of microclimate section features, a plurality of irrigation section features, a plurality of work section features, one or more images of the plant, or any combination thereof.

16. The method of claim 1, further comprising: if the plant is healthy and tracking the growth trajectory, optimizing a growth plan for the plant, applying an existing treatment to the plant, monitoring the plant, generating a work order to prune the plant, or any combination thereof.

17. The method of claim 1, wherein the data associated with the plant is at least partially obtained using a robot or based on one or more user inputs.

18. The method of claim 1, further comprising: assigning one or more tasks to a human worker if the plant is unhealthy or lagging the growth trajectory.

19. A system for administering one or more treatments to a plant in a greenhouse, comprising:

one or more processors;

a memory; and one or more programs, wherein the one or more programs are stored in the memory and configured to be executed by the one or more processors, the one or more programs including instructions for:

receiving data associated with the plant, wherein the data is at least partially obtained using one or more sensors in the greenhouse;

providing the received data to a trained machine-learning prediction model to obtain:

a set of present health feature values of the plant indicating what the health of the plant should be at a present time and generated by the trained machine-learning prediction model, wherein the set of present health feature values is determined based on historical data collected from the plant at one or more times prior to the present time and not based on observed health of the plant at the present time; and a set of future health predictions of the plant determined based on real-time data;

wherein the set of present health feature values and the set of future health predictions are with respect to a plurality of output features;

determining whether the plant is unhealthy or lagging a growth trajectory based on:

a first comparison of the set of present health feature values indicating what the health of the plant should be and the observed health of the plant at the present time, and a second comparison of the set of future health predictions and a future production goal of the plant;

if the plant is unhealthy or lagging the growth trajectory, identifying the one or more treatments for the plant, comprising:

identifying a subset of output features from the plurality of output features corresponding to features for which a threshold deviation was detected in the first comparison or the second comparison;
providing information related to the subset of output features to a trained machine-learning root cause analysis model to obtain one or more root causes;
identifying one or more mitigation actions based on the one or more root causes; and
providing information related to the one or more mitigation actions to a trained machine-learning work order model to obtain the one or more treatments;
and
controlling one or more robots in the greenhouse to administer the one or more treatments to the plant.

20. A non-transitory computer-readable storage medium storing one or more programs for administering one or more treatments to a plant in a greenhouse, the one or more programs comprising instructions, which when executed by one or more processors of an electronic device, cause the electronic device to:
receive data associated with the plant, wherein the data is at least partially obtained using one or more sensors in the greenhouse;
provide the received data to a trained machine-learning prediction model to obtain:
a set of present health feature values of the plant indicating what the health of the plant should be at a present time and generated by the trained machine-learning prediction model, wherein the set of present health feature values is determined based on historical data collected from the plant at one or more times prior to the present time and not based on observed health of the plant at the present time; and
a set of future health predictions of the plant determined based on real-time data;
wherein the set of present health feature values and the set of future health predictions are with respect to a plurality of output features;
determine whether the plant is unhealthy or lagging a growth trajectory based on:
a first comparison of the set of present health feature values indicating what the health of the plant should be and the observed health of the plant at the present time, and
a second comparison of the set of future health predictions and a future production goal of the plant;
if the plant is unhealthy or lagging the growth trajectory, identify the one or more treatments for the plant, comprising:
identifying a subset of output features from the plurality of output features corresponding to features for which a threshold deviation was detected in the first comparison or the second comparison;
providing information related to the subset of output features to a trained machine-learning root cause analysis model to obtain one or more root causes;
identifying one or more mitigation actions based on the one or more root causes; and
providing information related to the one or more mitigation actions to a trained machine-learning work order model to obtain the one or more treatments; and
control one or more robots in the greenhouse to administer the one or more treatments to the plant.

* * * * *